(12) United States Patent
Hirschhorn

(10) Patent No.: US 7,369,672 B2
(45) Date of Patent: May 6, 2008

(54) PERSONAL AUDIO VISUAL SYSTEM

(76) Inventor: Bruce D. Hirschhorn, 34 Farber Hill Rd., Boonton, NJ (US) 07005

( * ) Notice: Subject to any disclaimer, the term of this patent is extended or adjusted under 35 U.S.C. 154(b) by 915 days.

(21) Appl. No.: 10/457,158

(22) Filed: Jun. 9, 2003

(65) Prior Publication Data
US 2003/0235320 A1    Dec. 25, 2003

Related U.S. Application Data

(60) Provisional application No. 60/391,281, filed on Jun. 24, 2002.

(51) Int. Cl.
*H04R 1/02* (2006.01)
*H04R 9/06* (2006.01)

(52) U.S. Cl. .................. 381/333; 381/387; 348/790; 361/683; 248/917

(58) Field of Classification Search .............. 381/333, 381/306, 388, 332, 87, 386, 387; 348/827; 248/127, 158, 176.1, 560, 575
See application file for complete search history.

(56) References Cited

U.S. PATENT DOCUMENTS

| | | | |
|---|---|---|---|
| 4,509,184 A | 4/1985 | Yanagawa ................ 381/24 |
| 4,561,797 A * | 12/1985 | Aldridge .................... 403/58 |
| 4,802,074 A * | 1/1989 | Puschkarski ............... 362/287 |
| 4,826,145 A * | 5/1989 | Moore et al. .............. 267/293 |
| 5,274,709 A | 12/1993 | Koizumi ................... 381/24 |
| 5,524,062 A | 6/1996 | Oh .......................... 381/154 |
| 5,550,921 A | 8/1996 | Freadman ................. 381/24 |
| 5,668,882 A | 9/1997 | Hickman et al. .......... 381/24 |
| 5,687,246 A | 11/1997 | Lancon ..................... 381/188 |
| 5,742,690 A | 4/1998 | Edgar ....................... 381/24 |
| 5,841,418 A * | 11/1998 | Bril et al. .................. 345/3.1 |
| 5,898,137 A * | 4/1999 | Saito ........................ 181/144 |
| 5,956,411 A | 9/1999 | Edgar ....................... 381/97 |
| 6,024,335 A * | 2/2000 | Min .......................... 248/371 |
| 6,052,275 A * | 4/2000 | Joseph ..................... 361/683 |
| 6,055,320 A | 4/2000 | Wiener et al. ............ 381/343 |
| 6,104,443 A | 8/2000 | Adcock et al. ........... 348/827 |
| 6,471,363 B1 * | 10/2002 | Howell et al. ............ 362/11 |
| 6,819,550 B2 * | 11/2004 | Jobs et al. ................ 361/683 |

OTHER PUBLICATIONS

Reliable Office Supplies, 2003 Special Order Service catalog, p. 816.
The New Yorker magazine, Feb. 18 & 25, 2002, pp. 27-29, 38.

* cited by examiner

*Primary Examiner*—Vivian Chin
*Assistant Examiner*—Con P. Tran
(74) *Attorney, Agent, or Firm*—Michael J. Weins; Jeffrey E. Samprebon

(57) ABSTRACT

An audio visual system has a housing with a video display and one or more speakers. The speakers are housed in cavities which limit dispersion of the sound generated, and the video display is preferably a directional LCD display. The housing is preferably mounted to a base by an adjustable arm having passages to accommodate enclosed wiring. One adjustable arm has segments joined by dual-pivot joints, while another has segments joined by single pivot joints. In both types of arms, the frictional resistance of the joints can be adjusted. Preferably, the elements of the arm are strung onto the wiring prior to assembly. The housing can also contain a light source to provide a reading light.

20 Claims, 15 Drawing Sheets

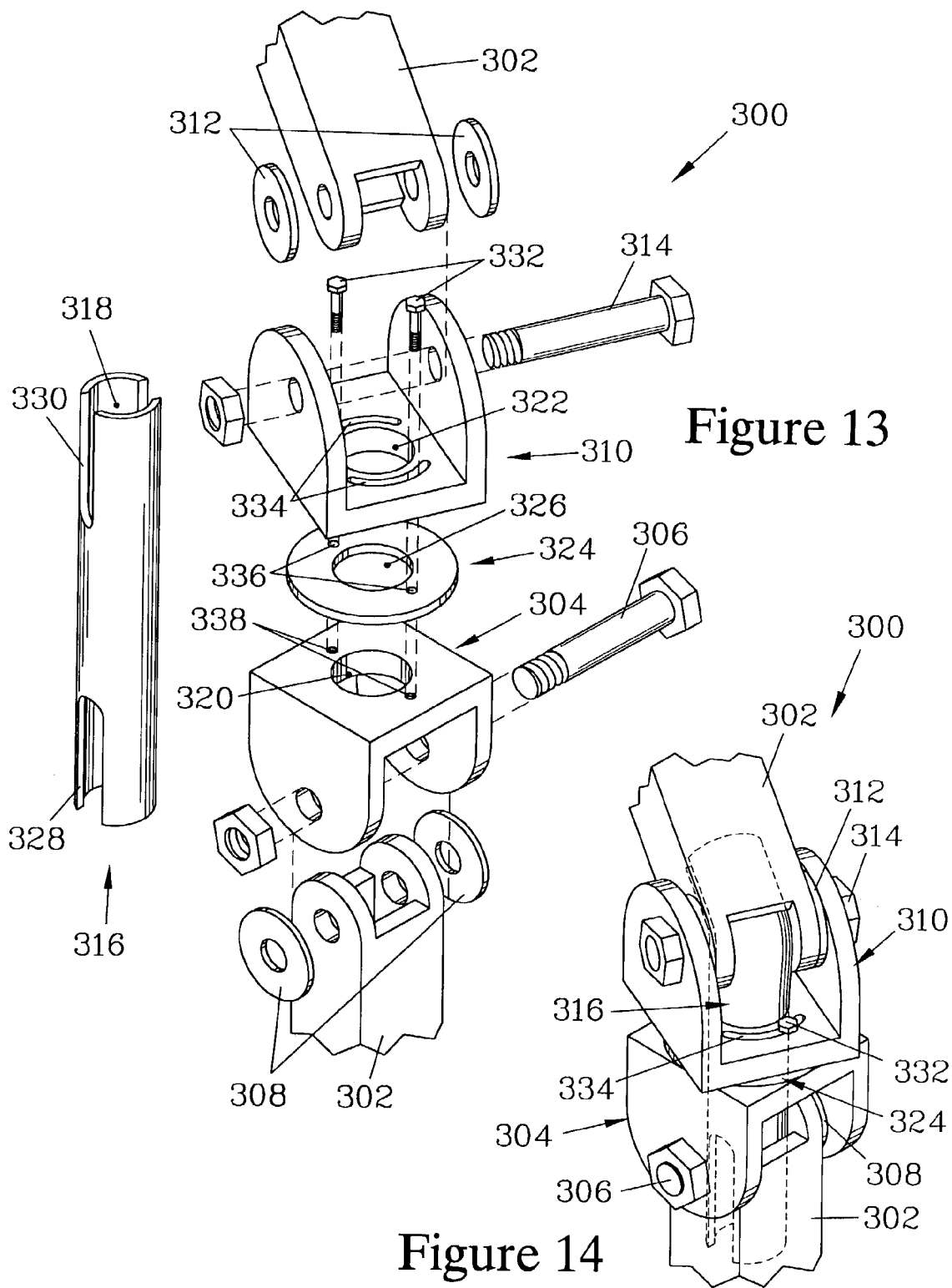

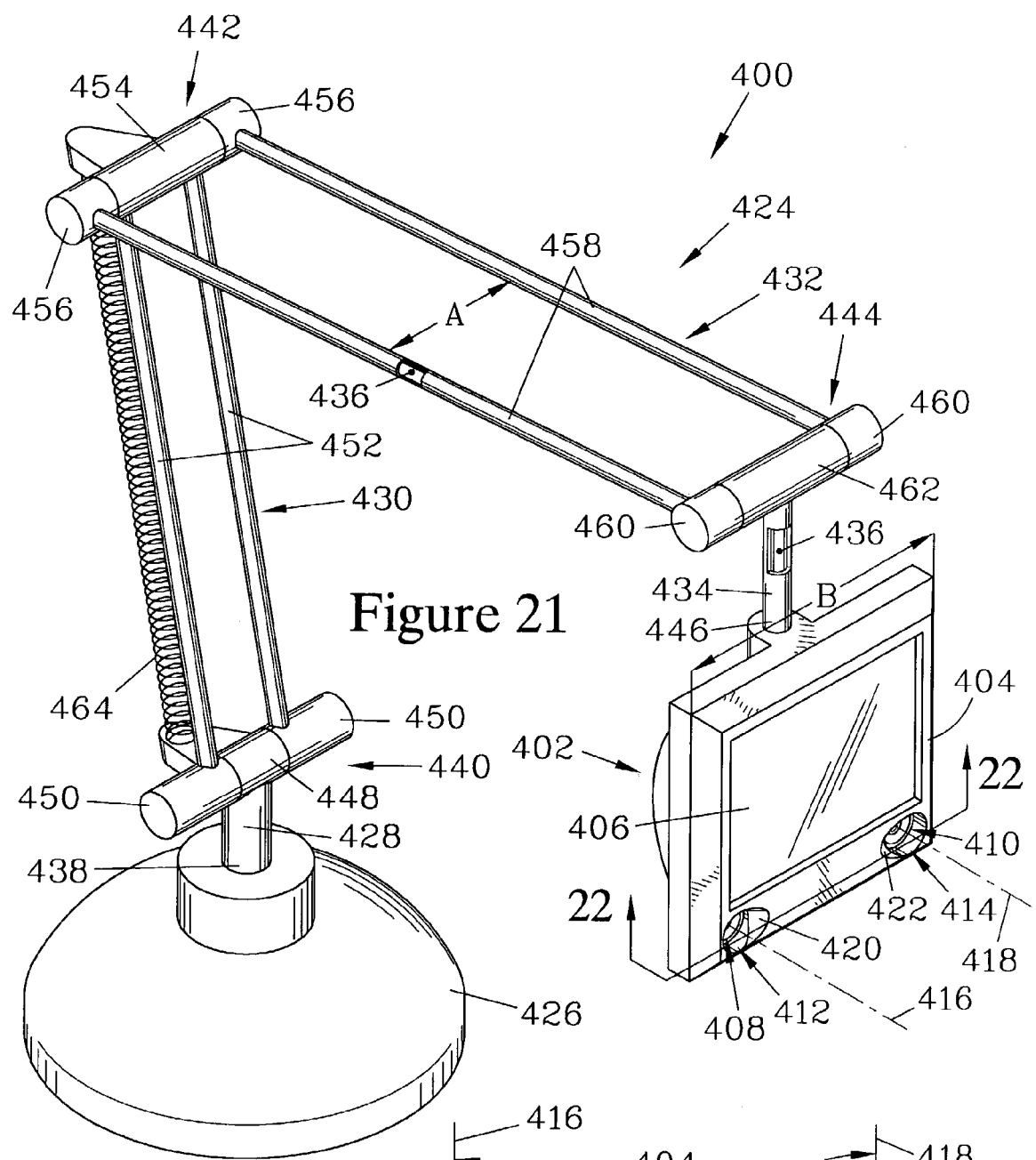
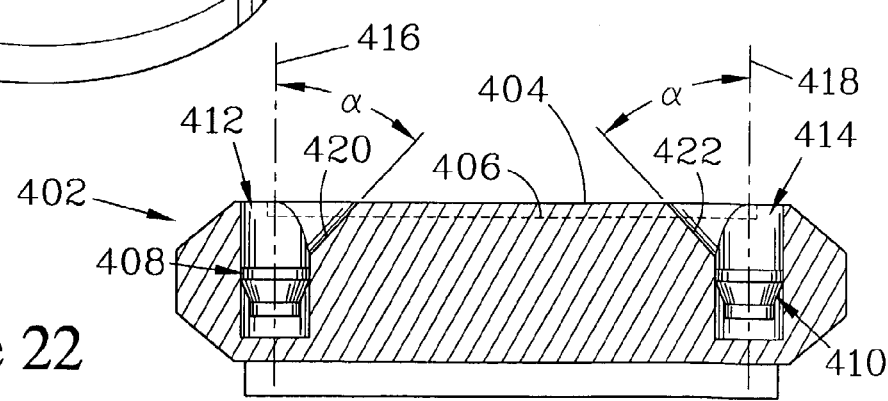

PERSONAL AUDIO VISUAL SYSTEM

FIELD OF THE INVENTION

The present invention relates to a multimedia presentation device and, more particularly, to an audio visual system which can be used by a single individual without interfering with the quiet enjoyment of others, even those in close proximity to the user.

BACKGROUND OF THE INVENTION

Multimedia presentation devices that have both audio and visual output are frequently used to provide both entertainment and information to users. While these devices have been well suited to providing output for multiple users or to a single isolated user, they have had limited ability to provide output to a single user who is not isolated. Typically, the sound generated from the speakers and light generated by the video display are broadcast and not limited to a region in close proximity of the intended user. The broadcasting of the sound and the light can have two disadvantages. On one hand, it limits the ability of the intended user to receive output which they do not want others to receive, and on the other hand, the broadcasting of the sound and light may distract and/or disturb others near the user. These problems also make it difficult for multiple users to receive individual outputs from independent devices.

Classically, cathode ray tube (CRT) television receivers have been used for audio visual systems. These receivers are not only energy inefficient, using CRT's to provide the visual output, but are frequently large and heavy, which makes repositioning of the television difficult. As a result, the user is frequently required to adjust his/her position in order to view the television. Small, portable televisions and other audio visual systems have been developed using LCD screens for the visual display; however, these devices typically broadcast the sound. Furthermore, these portable devices are designed to be held by the user or to rest on a horizontal surface, which again may require the user to assume a viewing position which is not comfortable to hold for long periods of time.

The issues of focusing the output to a particular user and allowing the user to view from an arbitrary position are particularly important to users in a hospital setting, where the audio visual device may be needed to provide entertainment for a patient who may need to view the audio visual device while in bed without disturbing another patient in the same room who either requires rest or does not wish to be disturbed by the audio visual presentations being viewed by others in the room.

A somewhat similar problem can occur in computer laboratories and dormitory rooms where there are likely to be multiple computers which, today, frequently have multimedia output including speakers. An attempt to address the problem of providing an audio output to a single user is addressed in U.S. Pat. Nos. 5,742,690 and 5,956,411. These patents teach a personal multimedia speaker system for a personal computer. The multimedia speakers have a linear array of speakers to direct sound to the location of the user. A folded waveguide coupled to the speaker array acts to cancel sound in other directions and improve sound quality. The system of the '690 and '411 patents is designed for use with a desktop computer and the depth of the speakers is not a concern, since it is designed to run the full depth of the computer monitor which can typically be 11 inches to 14 inches. These patents also do not address the issue of limiting the visual output to a single user.

Acoustic waveguides have also been employed to provide improved sound quality for large, traditional televisions, as taught in U.S. Pat. Nos. 5,274,709 and 5,524,062. However, here again the depth of the speakers is not a concern. Similarly, these patents do not address the ability to limit the visual output of the system.

For smaller portable computers, which in part overcome the size problem, the efforts to date have been devoted to improving the stereo bass response, such as taught in U.S. Pat. Nos. 5,550,921 and 5,668,882. These patents have not addressed the issue of directional sound, let alone of providing visual output for only a single user.

The issue of user comfort has been addressed by U.S. Pat. No. 6,104,443, which teaches a suspended television receiver or video monitor. The television receiver of the '443 patent is mounted to a positioning mechanism that allows the user to place the television receiver at a desired location and angle for comfortable viewing. The '443 patent discloses both a flexible gooseneck and a parallel arm structure where the parallel arms are connected to provide a scissor type action as they are adjusted to position the television receiver. While the '443 patent addresses the issue of user comfort, it does not address the issue of providing audio visual output to a single user. A gooseneck makes precisely positioning the television receiver difficult for a user, since the gooseneck can have a large elastic component when bent, which will relax once the user releases the television receiver. Alternatively, the gooseneck may be subject to drooping under the weight of the television receiver as the distance from the base increases. Additionally, a gooseneck is not well suited for readily moving the television receiver between viewing and storage positions. The alternative positioning mechanism taught, using parallel arms, can pinch the user as he/she adjusts the position of the television receiver.

Thus, there is a need for a device which can provide an audio visual output to a single user without such output being readily apparent to others in the vicinity of the user, and particularly for such a device which can be readily positioned to allow the user to receive the audio visual output while assuming a comfortable position.

SUMMARY OF THE INVENTION

The present invention relates to an audio visual system which is designed so as to personalize the output, allowing the user to enjoy the use of the audio visual system while not disturbing the quiet enjoyment of those in close proximity to the user. Such an audio visual system has many uses, such as in dormitory rooms, entertaining children in the presence of adults who are engaged in other activities, and allowing multiple parties to engage in different entertainment activities in the same area without being adversely affected by the activities of others.

The audio visual system has particular utility when adapted for use in combination with a multimedia entertainment center, so that the audio visual system is capable of receiving multimedia input from sources such as computer games, DVD recordings, television broadcasts, and audio and visual tapes, the audio visual system presenting audio and visual output for a user. The audio visual system is preferably adapted to receive the multimedia input from a variety of standard source signals that are output from the signal processors typically used in personal entertainment centers, personal computers, and similar multimedia devices. Some examples of devices which would be suitable for providing signals are cable tuners, satellite receivers, DVD players, video tape players, and video cameras. All such devices and combinations thereof are included under the broad term "entertainment center" which is used hereinafter in discussing the invention.

The audio visual system has a housing with a front face. A video display with a substantially planar display surface is mounted in the front face of the housing. The display is bounded by side edges and by top and bottom edges, the side edges providing the vertical definition of the display surface. The side edges are generally further spaced apart than the top and bottom edges and typically provide a width-to-height aspect ratio of 4:3 or 16:9 for the display surface.

It is preferred that the display be a liquid crystal display (LCD) display, since such displays offer low power demand, which reduces the light effect region (region of global lighting). Such liquid crystal displays also provide higher apparent resolution, due to their tighter pixel size and spacing (dot pitch) than CRT screens, thus permitting closer viewing and thus an effective magnification of the image when compared to CRT screens, as well as being viewed within the globally lit region.

Preferably, the liquid crystal display is a directional display to further limit the intrusion of the light on others. The display is considered directional when the image generated by the video display can only be viewed by a user when the line of vision of the user is substantially normal to the display surface, and in all cases is no more than about 25° from being normal to the display surface. More preferably, the image is only visible when the line of vision of the user is within about 20° of being normal to the display surface. Such directionality can be readily provided by a passive matrix liquid crystal display having the desired characteristics, passive matrix liquid crystal displays typically being more directional than active matrix liquid crystal displays. Additionally, passive matrix liquid crystal displays have even lower power demands than active matrix liquid crystal displays, thus further reducing the light effected zone.

At least one speaker assembly is mounted in the housing. Each of the at least one speaker assemblies has a driver having a driver axis, and a membrane symmetrically disposed about the driver axis. The membrane terminates in a distal end and a proximal end, with the distal end being attached to the driver. The proximal end is attached to a rim and completes each of the at least one speaker assemblies. The membranes generally have either an elliptical or circular cross section.

A cavity having a bottom is associated with each of the at least one speaker assemblies. Each of the cavities intersects the front face of the housing and is configured to accept one of the at least one speaker assemblies and position it such that its rim is positioned behind the front face of the housing. Each of the cavities is of sufficient size to provide a free volume behind the speaker assembly sufficient to assure a responsive speaker assembly and assure a separation between the cavity bottom and the speaker assembly.

Means for attenuating the radial dispersion of the sound generated by the at least one speaker assembly are provided. The details of the means depend, in part, on the speaker assemblies used. However, it is generally possible to limit the dispersion of the lower frequencies, and therefore reduce the off-axis acoustical energy, by mounting the rim in the cavity at an appropriate setback from the front face of the housing. The setback distance depends, in part, on the shape of the speaker. It is preferred to place the rim at a nominal setback from the front face equal to 50% to 100% of the nominal diameter of the proximal end of the membrane. For speakers with circular cross sections, the nominal diameter is the diameter of the cross section taken normal to the axis of the driver axis and the nominal setback is measured parallel to the driver axis. These limits on the setback of the rim provide reasonable attenuation of the dispersion of the longer wavelengths while not having the speaker so deeply recessed as to produce an opportunity for the reflection of sound waves of all frequencies off the walls of the cavity, which would result in a tubular sounding, or "tin can" effect. Furthermore, the same relationship can be applied to speakers having an elliptical membrane; in which case, the nominal diameter is the minor axis of the elliptical cross section and the setback of the rim is preferably equal to 50% to 100% of the minor axis of the elliptical cross section at the proximal end of the membrane. The cavity typically terminates at a planar front face so as to reside internally to the housing; however, to attain the desire setback distance, it may be desirable in some situations to have the cavity extend partially from the housing. In this case, a portion of the cavity is formed by a silo wall that extends from the housing. When a silo wall is employed, the end of the silo wall defines the front face at that point for purposes of determining a setback distance of the speaker assembly.

When a single speaker assembly is employed, it is preferred that the speaker assembly be centered with respect to the side edges of the video display. In this case, it is further preferred that the membrane be elliptical so as to increase the radiating area, which increases efficiency, while still allowing some directionality of the audio output so as to provide easy listening by a user at the intended listening distance. This intended listening distance is typically within the comfortable region of global lighting where the image can be readily viewed, and is typically from about 12 to 36 inches (30-90 cm).

While the audio visual system can employ a single speaker driven by a single audio channel, it is frequently preferred to employ multiple speakers (typically a left speaker and a right speaker), each driven by a distinct channel to enhance depth and spatial perception of the program material presented to the user by the audio visual system.

When multiple speakers are employed, there are a number of approaches which can be taken to focus the sound with respect to the expected location of the listener. One approach is to tilt the speakers such that the driver axes are directed toward a focal point where the listener is positioned. The focal point should be spaced apart from the video display by a distance where both the listening and the viewing is comfortable to the user, again typically 12 to 36 inches (30-90 cm). This technique of tilting the driver axes is effective in directing the higher frequencies, since these waves propagate with a large component of the energy being perpendicular to the membrane. The tilting will have less of an effect on the lower frequencies, as they tend to disperse at angles less perpendicular to the membrane, and radiate outward. Again, by positioning the rim of the driver with a setback from the housing front face by a nominal setback distance equal to 50% to 100% of the diameter of the proximal end of the membrane, the dispersion of the lower frequency sound can be limited, thereby further reducing the disturbance of the sound to others. When the driver axis is tilted relative to the front face of the housing, the nominal setback distance is defined as the minimum distance from the rim to the front face when measured parallel to the driver axis. The distance from the rim to the front face varies, since the axis of the speaker cavity is not normal to the front face.

When the driver axis of the speaker assembly is skewed, a portion of the cavity wall is directly presented to the surroundings. This exposed section of the wall can radiate lower frequency sounds waves, and thus diminish the effectiveness of the countersinking for the lower frequencies. This global dispersion of the lower frequencies can be reduced by providing hoods which protrude from the front face of the housing. However, this technique complicates fabrication of the housing and increases the overall thickness of the housing. For this reason, it is preferred to have the driver axes of the speaker assemblies normal to the housing front face. When the speakers are so oriented, they do not focus the higher frequency sound waves; however, these frequencies are transmitted over shorter distances and thus quickly dissipate. When the driver axes are normal to the front face, the nominal setback distance becomes the depth of the rim behind the front face.

When audio systems use dual speakers, the systems frequently provide separate left and right channel audio signals to drive the respective speakers so that the user perceives that some sounds are generated from the left and others from the right of the housing. Although the use of separate left and right channel audio has benefits over single channel audio, certain audio components, such as voice and music, are generally common to both channels. Thus, while there is a benefit from recessing the rims of the speaker assemblies to limit the dispersion of sound from the speakers, merely recessing the left and right channel speaker assemblies could result in a poor perceived acoustical quality for the intended listener, especially when the audio presentation is being used in conjunction with a video program.

The reason for this poor perception is that recessing the drivers can interfere with proper stereo imaging. When left and right speakers are oriented and aligned on a common plane and are surface-mounted so as to avoid any obstructions in between, the audio material common to both channels appears to emanate not from the individual drivers, but is actually perceived to emanate from the region that lies between the two speakers. Simultaneously, the listener perception of the left and right channel separation is lost with respect to this common audio material. This is known as "stereo imaging". However, when the left and right speaker assemblies are recessed in cylindrical cavities and are mounted at the rear of each cylinder, although the drivers are still oriented on the same plane, the walls of the cylinders create an obstruction between the drivers, so stereo imaging is impaired.

For this reason, when dual speakers are employed having recessed drivers, it is further preferred that portions of the cylindrical cavities be extended toward each other, such that angular paths to the front face are created to reduce obstruction of sound waves radiating toward a central plane. Preferably, the lips of the speaker cavities are beveled so that they slope toward each other and toward the listener, who is optimally centered between the speakers. It is further preferred that the bevel be angled at about 30° to 50° from the driver axis, which in turn is normal to the front face, depending on the size and shape of the driver. The particular angle will depend, in part, on the screen aspect of the video display. When a 4:3 aspect is used, a range of 30° to 35° is preferred; if the 16:9 ratio is used, then the range of 45° to 50° is preferred. These angles allow the speakers to be placed in line with the side edges of the display surface, and allow for some dispersion and interaction of the lower frequencies, which restores the stereo imaging, and lessens the tubular acoustical coloration. The system still limits the outward, and otherwise off-axis acoustical dispersion, such that neighbors and nearby listeners are not disturbed.

It is further preferred to limit the amount of power employed to present the audio program material to the user, so as to limit its broadcast region. To limit the power, it is advantageous to maintain the driver diameter as small as possible while still maintaining sufficient membrane surface area that frequencies as low as 400 to 800 Hz can be perceived. This can be readily accomplished by employing drivers having diameters as small as about 0.75 when properly matched in their cavities.

It is noteworthy that the depth of the cavities should generally be on the order of twice the nominal diameter of the speaker assembly, since proper operation of the speaker requires a certain volume of air behind the driver, the membrane, and the rim. This space behind the speaker assembly is needed to achieve the proper resonance and flatness in response. To achieve this, a speaker driver must be rigidly mounted in the speaker cavity, and a certain amount of airspace must be contained behind the speaker. It should also be appreciated that the depth must also be sufficient to avoid contact of the driver with the bottom of the cavity.

It is further preferred that the cavities be formed of or covered with some sound dampening material, such as wood, cloth, or low-density plastic, to minimize reflections. Similarly, it is preferred for the front face of the housing to be formed of a resilient material such as a hard plastic or metal.

For both single-speaker and multiple-speaker embodiments, it is preferred to provide a headphone jack to allow a user to listen to the audio output through headphones to further reduce the level of sound apparent to others in close proximity to the user, while at the same time providing less attenuation of the longer wavelengths. When a headphone jack is employed, the sound signal to the speaker(s) is interrupted when the headphones are plugged into the jack, in the manner well known in the art.

When a liquid crystal display is employed as the directional video display, it provides sufficient resolution that the audio visual system can be readily sized such that the housing can be hand-held. Typically, the directional video display will have a diagonal screen size of about 4-7 inches (10-18 cm), and have aspect ratios typically of 4:3 or 16:9. However; for the convenience and comfort of the user, it is preferred to have the housing supported, since the viewing and listening are strongly directionally dependant and maintaining the proper orientation by hand would become tiring. It is preferred to provide a base and means for attaching the base to the housing to provide articulation of the housing with respect to the base, thereby enhancing the ease of viewing by the user. With such supporting structure, the size of the housing can be increased, and larger video display screens, such as an 8 inch (20 cm) diagonal screen, could be employed; however, cost of manufacture increases significantly with increased screen size.

One such means for attaching the base to the housing is provided by having the base pivotably attached to the housing with a ball joint in which the joint elements are either frictionally engaged or lockably engaged, thereby providing rotational adjustability while translational adjustability is provided by selectively positioning the base on a surface on which the base rests.

However, it is frequently highly desirable to provide a fixed base and a more flexible means for attaching the base to the housing by providing a series of connections. In such cases, one connection element is a housing bracket that is attached to the housing, and can be made an integral part thereof. An adjustable arm serves as another connection element, the adjustable arm having an arm first end and an arm second end. The adjustability of the arm can be provided by employing a flexible conduit as the arm or, alternatively, by employing a segmented arm where the segments are connected with pivoting joints. Limitations of employing a flexible conduit for the adjustable arm are that it is difficult to make fine adjustments and that the conduit tends to creep when supporting the load of the housing. The use of a segmented arm allows the localization of the movement to pivoting joints that connect the segments, and the concentration of the relative movement allows finer control of the motion. However, once again the arms may be subject to creep, and care must be taken to provide sufficient resistance to creep under the load of the housing and the elements residing therein. Such resistance to creep can be provided by locking means or by providing sufficient frictional resistance between the elements of the pivoting joints.

A preferred arm configuration, which has particular utility for the present invention and, in fact, has utility in and of itself for other audio visual applications, is a multi-segment arm connected by adjustable joints where the degree of friction between components of the joint can be adjusted. In some embodiments, some of the arm segments are formed with multiple arm segment elements, in which case all of the arm elements in a given arm segment move as unit.

It is further preferred that the arm segments and pivoting joints provide one or more continuous internal paths of sufficient size to allow passing cables and/or wires through the arm to convey power and/or audio visual signals. It is further preferred that the arm be so configured that continuous wires can be passed through the arm.

Where the area around the base is congested, it is preferred that the pivot joints between the base and the arm and between the arm segments have dual pivot axes which are rotatably mounted with respect to each other and rotate in planes with are parallel to each other. Each of the connected arm segments in turn is pivotally mounted with respect to one of the dual pivot axes.

It is further preferred that at least one switch be provided which allows the user to turn on and off the video display and the at least one speaker without concern as to the state of the entertainment center.

In one further preferred embodiment employing an adjustable arm, it is preferred to have the housing bracket mounted to the top of the housing and to provide a light source, such as a row of LED's, on the bottom of the housing. The light source provides a reading light. When a light source is included, the switch should be a multiple-position switch that allows controlling the light source independently from the video display and/or the at least one speaker.

BRIEF DESCRIPTION OF THE DRAWINGS

FIG. 2 illustrates the relative position of the speaker assembly in the speaker cavity as well as the major axis of the elliptical driver.

FIG. 9 further illustrates the inclination of two speaker cavities with respect to a front face of the housing. The axes meet at a common focal point spaced apart from the front face and centered with respect to the directional video display to preferentially direct the higher frequencies of the sound to a user.

FIG. 13 is an exploded view of another dual axis adjustable joint which provides a range of motion similar to that of the adjustable joint shown in FIG. 8. The adjustable joint shown in FIG. 13 is designed so that the frictional forces resisting movement of arm segments with respect to each other and the frictional forces between two saddle brackets are adjustable. This embodiment also has a flexible tube that serves as a cable sheath for maintaining the cable within the confines of the joint when the joint is flexed.

FIG. 14 is an assembled view of the joint illustrated in FIG. 13.

FIG. 18 also illustrates two alternative clips which can be employed in the coupling to adjust the degree of friction between the saddle brackets.

FIG. 21 is an isometric view that illustrates another embodiment of the audio visual system of the present invention, which employs a different adjustable arm to support an audio visual display. In this embodiment, the adjustable arm has rigid segments connected by pivot joints. The arm terminates in an arm first end, which is rotatably mounted to a base, and an arm second end that is rotatably connected to a housing. The arm has two intermediate sections having pivot joints that are connected by a spring which counters the effects of torque created by the weight of the audio visual display.

FIG. 22 is a view of section 22-22 of FIG. 21 showing further details of speaker cavities which are employed in this embodiment. This embodiment employs cavities which have front sections that slope toward each other to improve the stereo imaging of the sound output of the audio visual system.

FIG. 29 shows the connector in an inverted position to illustrate the passage therethrough.

DETAILED DESCRIPTION OF THE PREFERRED EMBODIMENTS

Figure 1:
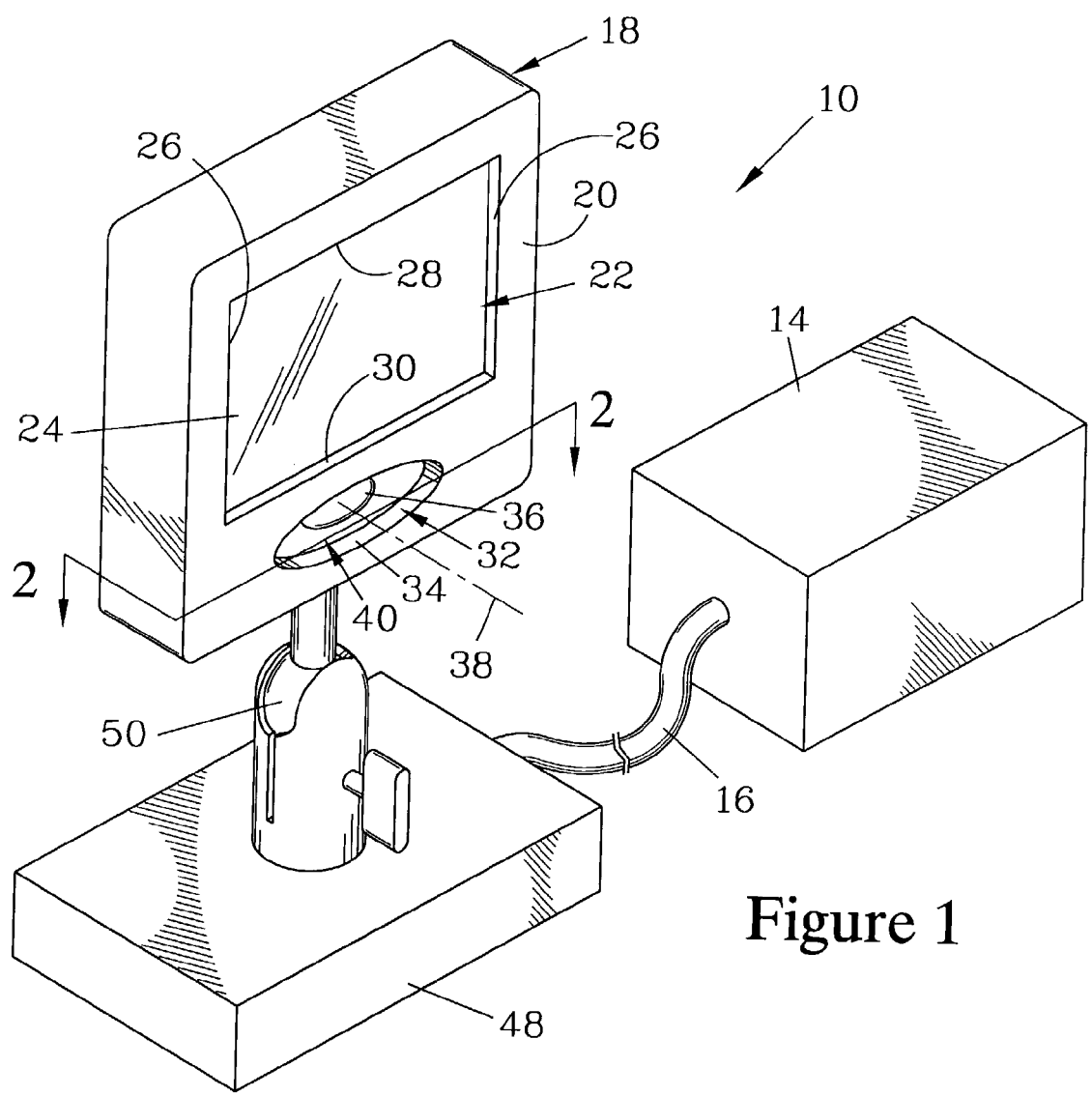
FIG. 1 is an isometric view that illustrates an audio visual system that forms one embodiment of the present invention. The audio visual system of this embodiment is shown used in combination with an entertainment center. In this embodiment, the audio visual system has a directional video display and a single speaker assembly which has an elliptical driver attached to a membrane which terminates in a rim. The elliptical shape reduces the contribution of the lower frequency sounds, which are less directional in character and are affected by the minimum rim dimension. Having the membrane elliptical increases the radiating area, which increases efficiency, while still allowing some directionality of the audio program so as to provide easy listening by a user at the intended listening distance. The speaker assembly is mounted in a speaker cavity and is positioned beneath the directional video display. A base is provided, which is pivotally attached to the housing. The base and the pivotal mount are for the convenience of a user and allow the housing to be positioned on a horizontal surface near the user and tilted to the appropriate angle for viewing.

FIG. 1 is an isometric view of an audio visual system 10 that forms one embodiment of the present invention. The audio visual system 10 is designed for an individual user 12 (illustrated in FIG. 4) to allow the user 12 to enjoy the output from a multimedia signal source such as an entertainment center 14 which has the capacity to generate signals from one or more signal sources such as taped videos, DVD, TV, interactive games, and stereo music from radio and other sources and transmit them to the audio visual system 10 via an entertainment center cable 16. Alternatively, the signals could be transmitted by various wireless techniques known to one skilled in the art.

The audio visual system 10 has a housing 18 having a front face 20. A video display 22 with a substantially planar display surface 24 is mounted in the front face 20. The video display 22 should be preferentially viewable by the user 12 so as not to interfere with the quiet enjoyment of others in the vicinity of the user 12. Having a low power display reduces the light-affected region around the video display 22, and also having a high resolution display allows the user 12 to be in close proximity to the video display 22 and thus allow for a reduced size of the video display 22. Both of these features help preserve the quiet enjoyment of those around the user. A liquid crystal display has both of these properties, and thus is particularly beneficial for use in such video displays.

It is preferred for the video display 22 to provide directional transmission which is directed substantially normal to the front face 20 of the housing 18. This preferred directional characteristic of the video display 22 is provided by using a passive matrix liquid crystal display which is selected to provide an image to the user 12 only when the user 12 is positioned so as to be viewing the substantially planar display surface 24 in a direction substantially normal thereto. It is further preferred that the passive matrix display is selected such that it is viewable only when the user is positioned within a solid angle of no greater than about 20° from normal. Such displays are commercially available from a variety of manufacturers, such as Sharp and Fujitsu. This limit on the angular dispersion helps prevent others in the vicinity of the substantially planar display surface 24 from being distracted by the content it is displaying. The use of a passive matrix display further reduces the power needed to operate the video display 22 and further reduces the emitted light, which might otherwise create an annoyance to those in the vicinity of the substantially planar display surface 24.

The substantially planar display surface 24 is bounded by side edges 26, a top edge 28, and a bottom edge 30. The side edges 26 generally serve to provide vertical definition of an image on the directional video display 22 when the signals are processed.

Figure 2:
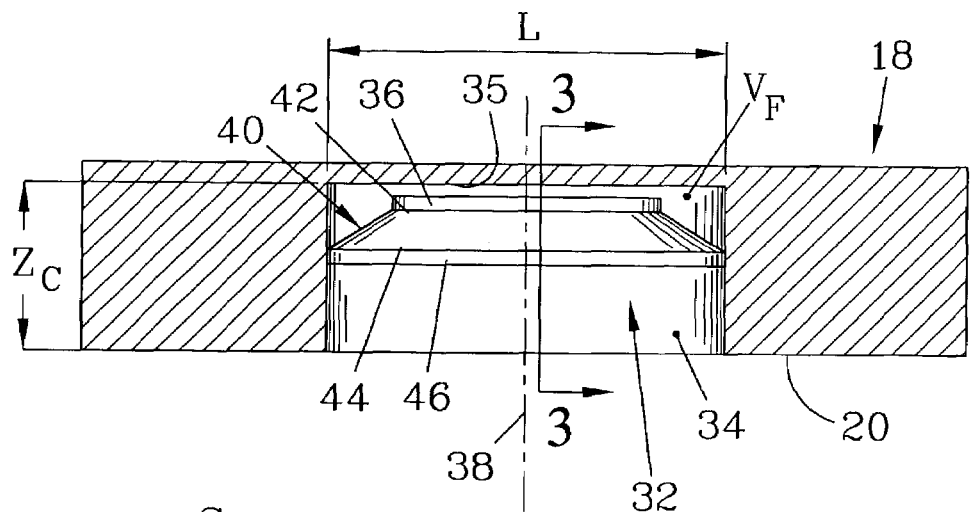
FIG. 2 is a view of the section 2-2 of FIG. 1 and shows further details of the speaker assembly and its associated cavity.
Figure 3:
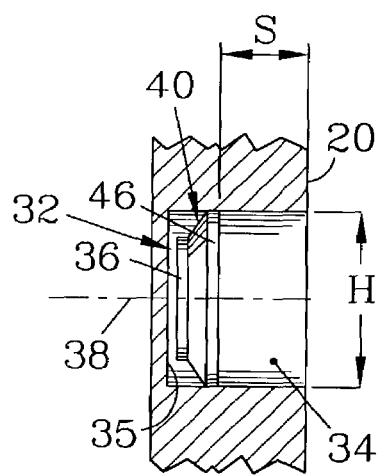
FIG. 3 is a partial section view of FIG. 1 cutting at a plane indicated by 3-3 of FIG. 2. This view shows both the position of the rim in the speaker assembly as well as the minor diameter of the elliptical driver.

A speaker assembly 32 is mounted in a speaker cavity 34 which intersects the front face 20 of the housing 18 and terminates at a cavity rear wall 35, shown in FIGS. 2 and 3 which show cross sections of the speaker cavity 34. The speaker assembly 32 has a driver 36 having a driver axis 38, and a membrane 40 symmetrically disposed about the driver axis 38. The membrane 40 terminates in a membrane distal end 42 and a membrane proximal end 44, with the membrane distal end 42 being attached to the driver 36. The membrane proximal end 44 is attached to a rim 46.

The speaker cavity 34 is further configured such that it intersects the front face 20 of the housing 18 normally. Furthermore, the speaker cavity 34 is provided with a cavity depth $Z_C$ sufficiently large that the speaker assembly 32 can be housed in the speaker cavity 34 with the rim 46 of the speaker assembly 32 positioned behind the front face 20 of the housing 18 while still providing a free volume $V_F$ behind the speaker assembly 32. The rim 46 is setback from the front face 20 by a setback distance S (shown in FIG. 3), while the cavity depth $Z_C$ is sufficiently large to allow mounting the speaker assembly 32 at the desired setback distance S without having the driver 36 contact the cavity rear wall 35 as the speaker assembly 32 operates.

A single speaker assembly is employed in this embodiment, and the speaker assembly 32 is preferably elliptical in cross section, having a rim minor axis H (illustrated in FIG. 3) that is substantially shorter than a rim major axis L (shown in FIG. 2). This geometry is chosen since the relatively small minor axis H substantially reduces the longer wavelengths of the sound generated by the speaker assembly 32 while still providing sufficient radiating area of the membrane 40 to allow user to conveniently listen to the output of the speaker assembly. The setback distance S of the rim 46 is preferably maintained between 50% and 100% of the minor axis h of the elliptical cross section at the proximal end 44 of the membrane 40. These limits on the setback distance S of the rim 46 provide reasonable attenuation of the dispersion of the longer wavelengths while not having the speaker so deeply recessed as to produce an opportunity for the reflection of sound waves of all frequencies off the walls of the cavity, which would result in a tubular sounding, or "tin can" effect.

Another benefit of the present invention is that, by providing an image in close proximity to the user 12, the display surface 24 can be small in size yet provide the effect of a large screen. In fact, the size of the display surface 24 can be readily maintained with a size sufficiently small to be maintained in a housing having a maximum dimension in the neighborhood of 7 inches (18 cm), allowing the housing 18 to be readily hand held. Alternatively, the housing 18 can be positioned on a nearby surface. However, it is preferred to employ a base 48 attached to the housing 18 by a coupling 50, as shown in FIG. 1. Signal leads (not shown) pass through the base 48 and the coupling 50 to the driver 36 of the speaker assembly 32 and to the direction video display 22. This allows the housing 18 to be placed on a surface near the user 12 and adjustments to location can be made by translating the base 48, while adjustments of the inclination of the display surface 24 with respect to the user 12 can be made by adjusting the coupling 50. Supporting the housing 18 is particularly advantageous when the video display 22 is a directional display, in order to provide the user comfortable viewing in a relaxed manner without concern of losing the images as a result of a slight shift of his/her position.

Figure 4:
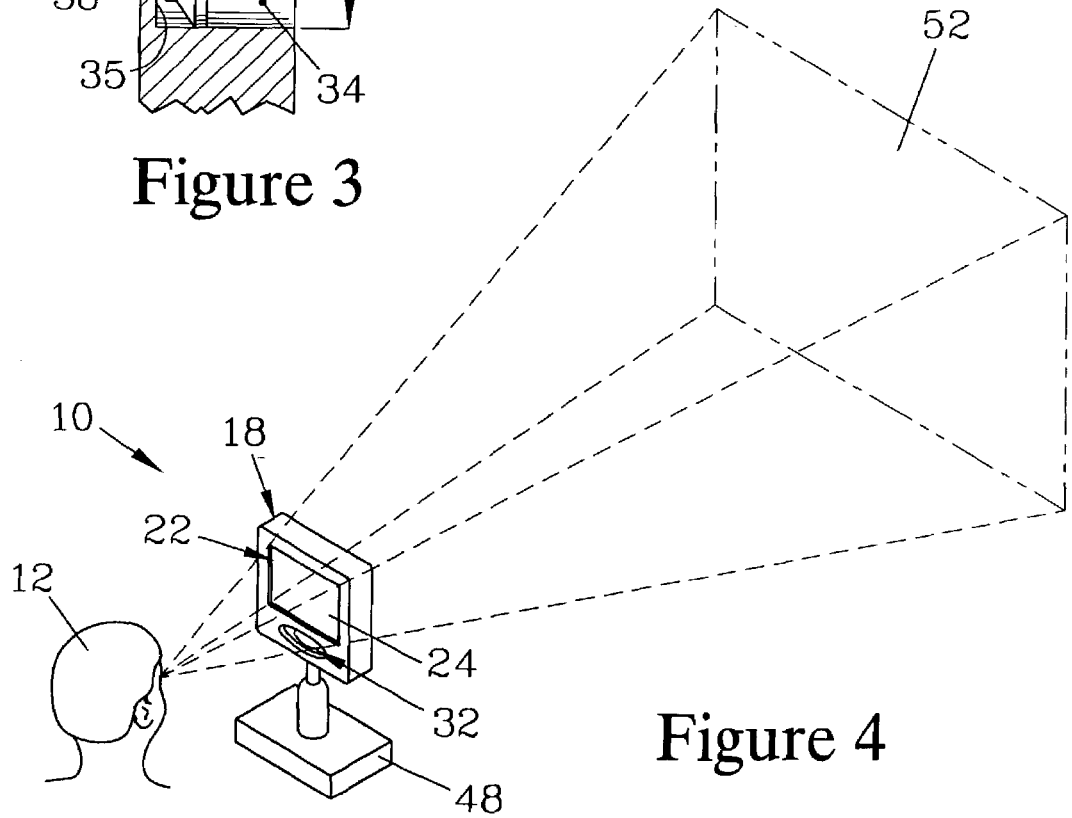
FIG. 4 is a schematic representation of the benefit in perceived size that is obtained from positioning the directional video display in close proximity to the user. The proximity of the display allows a reduced size that, in combination with the use of a passive matrix liquid crystal display, results in a substantial reduction in the energy requirements for the display. This reduction in power reduces the affected sphere of illumination and thus the visual disturbance to others. The proximity of the speaker to the user also results in a reduction in the power retirements for the speaker, thereby reducing excess noise and helping to reduce the disturbance to others by the output of the speaker.

As pointed out earlier, one of the benefits of the audio visual system 10 is its low demand for power that results in part because of its proximity to the user 12, and in part due to the use of a liquid crystal display for the video display 22. The power consumption of a passive liquid crystal display is substantially less than the power consumption of an equivalent-sized CRT TV screen, thus providing one aspect of power reduction. Furthermore as can be seen in FIG. 4, in view of the close proximity of the small substantially planar display surface 24 to the user 12, the substantially planar display surface 24 provides a perceived screen size 52 which is substantially larger. This effective magnification of the screen reduces the size of the actual screen and further reduces the power consumption of the screen. Also, if a standard CRT TV screen were used at its conventional distance from the user 12, not only would it draw additional power, but also the dispersion of light would interfere with the quiet enjoyment of others over a larger area, even if the output were to be directional. Furthermore, a conventional TV could not be brought in such close proximity to the user since, if it were placed in such close proximity, the picture would be grainy and the user would be exposed to radiation generated by the CRT.

The close proximity of the substantially planar display surface 24 to the user 12 also assures that the speaker assembly 32 is only a short distance from the user 12, and thus it too can be designed to operate with a small power input which further avoids disturbing the quiet enjoyment of others nearby.

Another benefit of the embodiment shown in FIG. 1 is that it does not require radio frequency signals to be processed in the housing 18, and thus reduces the weight and volume of the elements that are contained in the housing 18 as well as the shielding needed for interference-free operation of the speaker assembly 32 and the video display 22.

Figure 5:
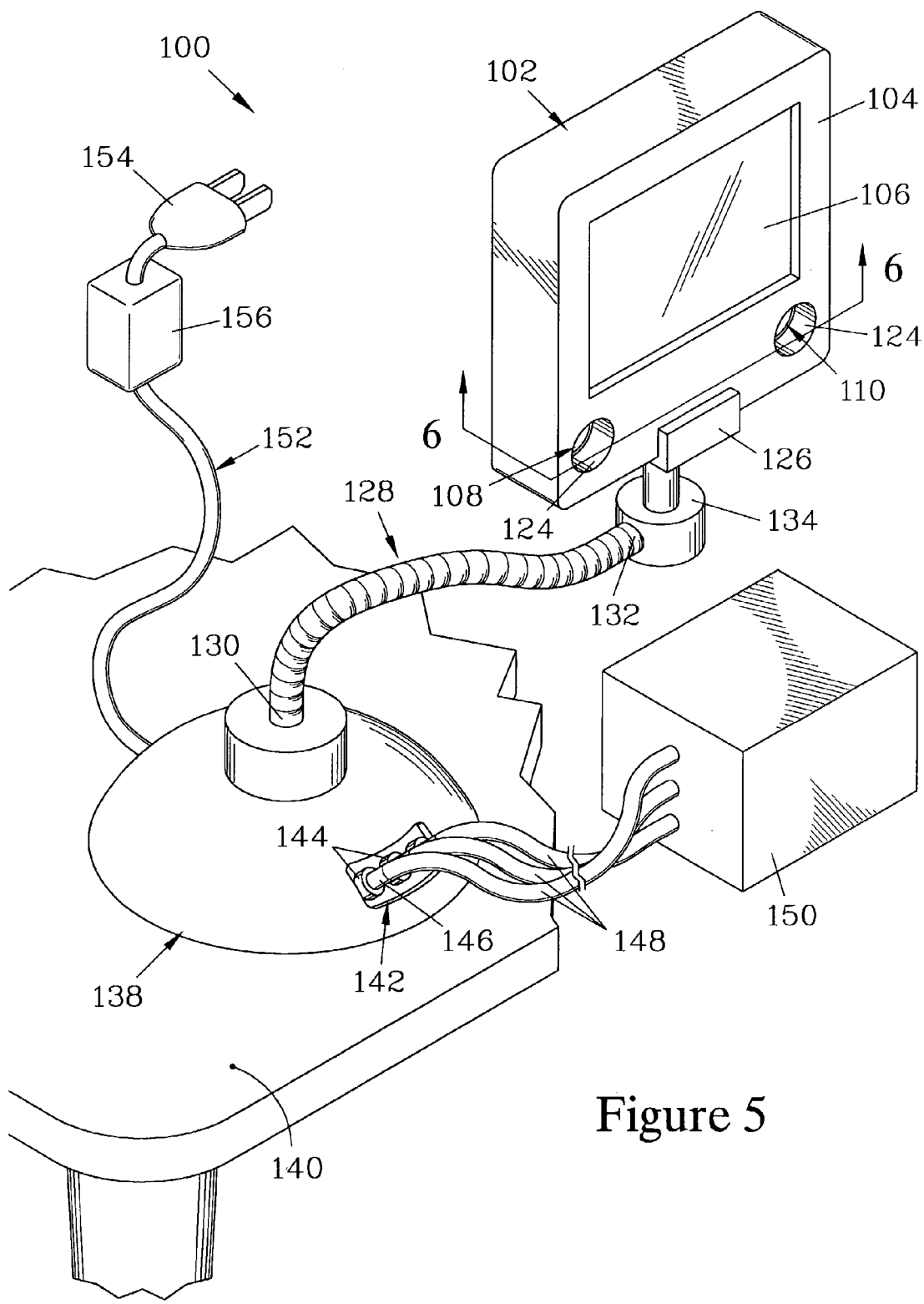
FIG. 5 is an isometric view of an audio visual system that forms another embodiment of the present invention, again shown used in combination with an entertainment center. This embodiment again has a LCD video display mounted in a housing and behind a front face of the housing. However, this embodiment employs two speaker assemblies having circular cross sections. Each of the speaker assemblies is mounted in a speaker cavity which extends normal to the front face of the housing and passes therethrough. There is also a base for supporting the housing; however, in this embodiment, the base is connected to an adjustable arm that provides greater freedom in the positioning of the directional video display and speakers with respect to the user. The adjustable arm in this embodiment is a flexible conduit. Power is supplied to the speakers and to the directional video display from a wall socket, and a power cord is provided which includes a transformer that reduces the voltage to an appropriate level for the speakers and the LCD video display.

FIG. 5 is an isometric view of an audio visual system 100 which is similar in many respects to the audio visual system 10 illustrated in FIG. 1. The audio visual system 100 has a housing 102 having a front face 104, and has a directional video display 106 which is mounted in the front face 104 and is a directional passive matrix liquid crystal display. This embodiment differs, in part, in that the housing 102 has both a first speaker assembly 108 and a second speaker assembly 110 mounted behind its front face 104. The first speaker assembly 108 and the second speaker assembly 110 are mounted underneath the directional video display 106 and are symmetrically disposed with respect thereto.

Figure 6:
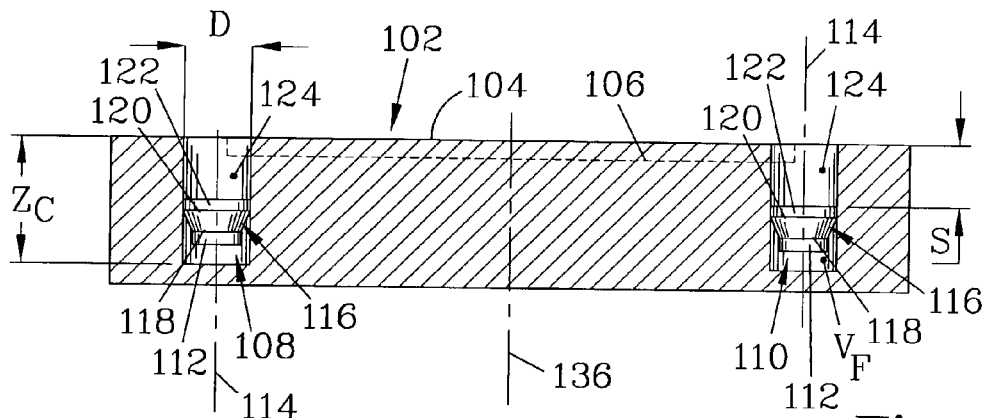
FIG. 6 is a view of section 6-6 of FIG. 5 and illustrates details of the speaker assemblies and their associated speaker cavities. The speaker cavities are each configured so as to provide a free volume behind the associated speaker assembly and are formed as cylinders concentric with a driver axis of the speaker assembly. These driver axes are normal to the front face of the housing.

Referring to FIG. 6, the first and second speaker assemblies (108, 110) each has a driver 112 having a driver axis 114, and a membrane 116 symmetrically disposed about the driver axis 114. Each membrane 116 terminates in a distal end 118 and a proximal end 120, with the distal end 118 being attached to the first driver 112. The proximal end 120 is attached to a rim 122.

Each speaker assembly (108, 110) is circular in cross section, having a rim diameter D, and is mounted in a speaker cavity 124 which is cylindrical in shape and sized such that the rim 122 can slidably engage the speaker cavity 124. The speaker cavity 124 is substantially normal to the front face 104 of the housing 102.

Each of the cavities 124 has a cavity depth $Z_C$ which is sufficient to allow the rim 122 of the speaker assembly (108, 110) to be placed with the rim 122 of the speaker being at a setback distance S with respect to the front face 104, where the setback distance S is selected to be greater than 0.5 D, and is more preferably selected such that 0.5D<S<D. As discussed earlier, this range of limits on the setback distance S of the rim 122 provides reasonable attenuation of the dispersion of the longer wavelengths while not having the speaker assembly (108, 110) so deeply recessed as to produce an opportunity for the reflection of sound waves of all frequencies off the walls of the cavity 124, which would result in a tubular sounding, or "tin can" effect. The cavity depth $Z_C$ must also be sufficiently large that, when the speaker assembly (108, 110) is positioned in the speaker cavity 124, there is a sufficient free volume $V_F$ behind the driver 112 to produce the desired pressures and resonance.

Referring again to FIG. 5, a housing bracket 126 is attached to the housing 102 and can be made an integral part thereof. An adjustable arm 128 having an arm first end 130 and an arm second end 132 is provided. In this embodiment, the adjustable arm 128 is provided by a flexible conduit. A coupling 134 connects the arm second end 132 to the housing bracket 126. The housing bracket 126 and the coupling 134 can be formed as an integral part. The coupling 134 preferably allows adjustment between the adjustable arm 128 and the housing 102. This adjustment is particularly helpful when the adjustable arm 128 is a flexible conduit, since any positioning of the flexible conduit 128 may have a large elastic component, thus making small adjustments in position at the arm second end 132 difficult. The adjustability of the adjustable arm 128 aids in aligning the directional video display 106 with a user (not shown) so as to optimize the clarity of the image on the directional video display 106. This adjustability allows the eyes of the user to be positioned symmetrically with respect to a plane 136 (shown in FIG. 6) that is normal to the video display 106 and vertically bisects the same, which enhances not only the viewing but also the listening enjoyment of the user.

A base 138 is attached to the arm first end 130 of the adjustable arm 128. The base 138 is designed to rest on a horizontal surface 140 such as a table top. Having the base 138 rest on the surface 140 enhances the positionability of the housing 102 with respect to the user, since the audio visual system 100 can be displaced and rotated about a vertical axis with respect to the user without relying on the flexibility of the adjustable arm 128 and/or the coupling 134 by positioning the base 138 as desired on the surface 140.

The base 138 has a receptor panel 142 that has ports 144 configured to accept cable connectors 146 attached to cables 148 providing signals from an existing audio and/or video signal source, schematically represented by an entertainment center 150. In this embodiment, the receptor panel 142 has multiple ports 144, each taking a cable 148 from a particular source to provide greater flexibility in the signals which can be supplied. In a typical example, separate cables 148 might be employed for composite video, right channel audio, and left channel audio signals. A power cord 152 is provided to supply power to the speaker assemblies (108, 110) and to the video display 106. Typically, the speaker assemblies (108, 110) and the video display 106 operate at low voltage and, if the power cord 152 is connected to a conventional 120 VAC wall source by a plug 154, a step-down transformer 156 can be readily interposed between the plug 154 and the base 138. One preferred position for locating the step-down transformer 156 is in the base 138, where the step-down transformer 156 adds ballast to the base 138 to improve the physical stability of the audio visual system 100. However, for regulatory reasons, it is often preferable to place the step-down transformer 156 outside the base 138, as illustrated. In the case of the speakers (108, 110), the power cord 152 typically supplies power to an amplifier and the amplified audio signal then powers the speakers (108, 110).

Signals from the ports 144 are transmitted to the speaker assemblies (108, 110) and the video display 106 by shielded cables (not shown) which pass through the adjustable arm 128 and the coupling 134 and into the housing 102. These shielded cables serve as means for communication between the ports 144 and the speaker assemblies (108, 110) and the video display 106. An S-VIDEO connector cable, such as produced by a variety of suppliers and commonly known in the industry, or a miniaturized cable constructed to have similar characteristics can provide shielded communication of the audio and video signals as they pass from the base 138 to the speaker assemblies (108, 110) and the video display 106. The power cord 152 also passes through the adjustable arm 128 to provide power to the components in the housing 102.

Figure 7:
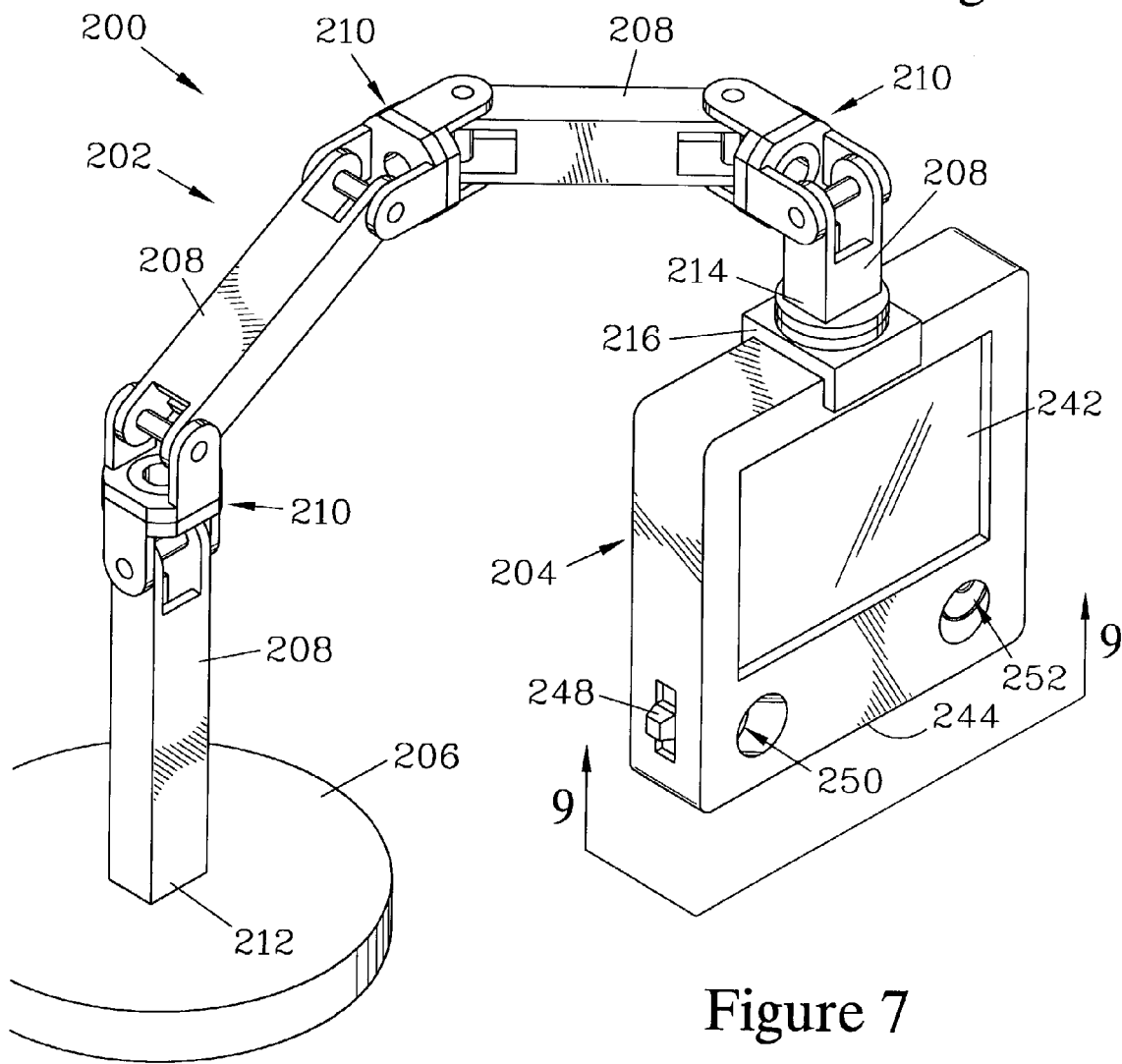
FIG. 7 is a view that illustrates another embodiment of the audio visual system of the present invention. In this embodiment, the speaker cavities are canted and have driver axes which intersect and preferentially direct the higher frequencies of the sound to a user located at the preferred location for listening to the audio output, rather than being positioned normal to the front face of the housing, as are the cavities of the embodiment shown in FIG. 5. This embodiment, like the embodiment shown in FIG. 5, employs an adjustable arm which provides great flexibility in the positioning of the housing. In this embodiment, the arm is constructed from a series of hollow arm segments connected by adjustable joint assemblies having dual pivot axes which are rotatable with respect to each other to provide three degrees of freedom between adjacent arm segments. This adjustable arm configuration is well suited for applications where the power and signals are to be provided by power and signal cables, since it provides a continuous passage along the length of the adjustable arm through which shielded cables can be passed with sufficient shielding to prevent interference of the power with the audio/video signals. The adjustable joint assemblies, with their dual axes which are adjustable with respect to each other, maintain the flexibility of the arm so that it can be passed around obstacles; however, due to the localization of the pivotal action, the arm can be more easily readjusted and is less subject to drooping than the arm shown in FIG. 5. This arm configuration is also readily foldable to facilitate storage.

FIG. 7 illustrates an audio visual system 200 which forms another embodiment of the present invention. The audio visual system 200 employs an adjustable arm 202 to position a housing 204 with respect to a base 206, where the adjustable arm 202 is constructed from rigid arm segments 208 that are pivotally and rotatably engaged with respect to each other with bi-pivotable adjustable joint assemblies 210 to provide for adjustability. The use of rigid arm segments 208 in the adjustable arm 202 has benefits not possessed by a flexible conduit such as employed in the embodiment illustrated in FIG. 5, and has utility beyond the particular application to support a housing 204 of a privatized audio visual system, since it can provide an arm with a relatively large passage therethrough and, being segmented, allows finer adjustment of the adjustable arm 202 end points. The finer adjustment results from the arm 202 being segmented with the adjustment being localized at the bi-pivotable adjustable joint assemblies 210, which results in the adjustable arm 202 being generally less subject to spring-back than a flexible conduit.

The adjustable arm 202 terminates in a first arm end 212 and a second arm end 214. The first arm end 212 is affixed to the base 206, while the second arm end 214 is mounted to a housing bracket 216. The housing bracket 216 can be formed as an integral part of the housing 204, and in this embodiment the housing bracket 216 also serves as a coupling. As discussed in greater detail below, the rigid arm segments 208 are hollow and the adjustable joint assemblies 210 each have a passage therethrough to allow cables and power cords to be passed through the adjustable arm 202. While the arm segments 208 are illustrated as being formed of rectangular tubular stock, other tubular shapes could be employed while allowing cables to be passed therethrough.

Having the arm segments 208 formed as single elements has advantages over the use of paired elements that are pivotably joined so as to change their spacial separation as the arm is adjusted, such as is taught in U.S. Pat. No. 6,104,443, since the adjustable arm 202 may be adjusted by the user without concern of being pinched when manipulating the arm segments. The risk of pinching is eliminated in the adjustable arm 202, since the adjustable arm 202 does not have paired elements in the arm segments 208 which can be brought into contact during use as the user manipulates elements of the arm 202.

Figure 8:
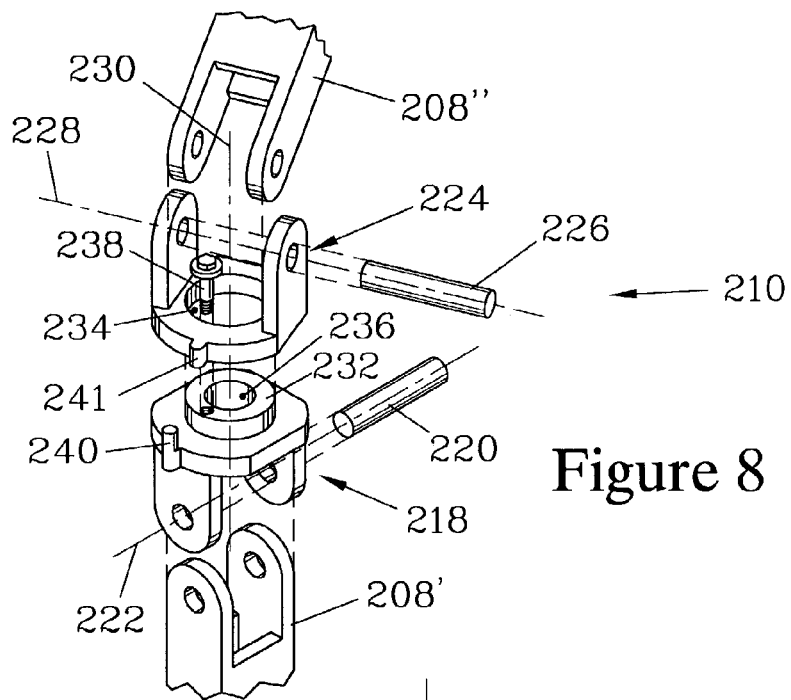
FIG. 8 is an exploded detail view showing details of one of the adjustable joint assemblies employed to connect two adjacent arm segments of the embodiment shown in FIG. 7. The adjustable joint assembly has a joint passage therethrough that allows for the passage of a cable through the length of the arm and permits the cable to provide both power and signals to the speakers and the directional video display via cords and cables, without requiring the cords and cables to pass outside the joint. In this embodiment, maintaining the cables internal relies on the stiffness of the cables, and the frictional forces of the joint are not readily adjustable.

One of the bi-pivotable adjustable joint assemblies 210 in this embodiment is illustrated in greater detail in FIG. 8, which shows the adjustable joint assembly 210 exploded. The adjustable joint assembly 210 not only provides pivotal motion between the rigid arm segments 208 about two axes of rotation, allowing pivotable adjustment between adjoining arm segments 208, but also allows rotation of these axes with respect to each other. The adjustable joint 210 thus allows both pivotable and rotational movement between the connected arm segments 208.

The adjustable joint assembly 210 employs a first saddle bracket 218, which pivotably, slidably engages one of the rigid arm segments 208' and, once engaged, is held there by friction forces either by direct contact of the engaging surfaces or through contact with an intermediate element maintained therebetween (this latter scheme being discussed below in the description of FIGS. 13 and 14). A first pivot pin 220 passing through the first saddle bracket 218 and through one of the rigid arm segments 208' provides a first pivot axis 222. Similarly, a second saddle bracket 224 pivotably, slidably engages another of the rigid arm segments 208" and, once engaged, is held by friction forces either by direct contact of the engaging surfaces or through contact with an intermediate element maintained therebetween. A second pivot pin 226 passing through the second saddle bracket 224 and the other rigid arm segment 208" provides a second pivot axis 228.

The saddle brackets (218, 224) are rotatably engaged with each other about a bracket rotation axis 230, and means are provided to maintain the saddle brackets (218, 224) in frictional engagement. In the adjustable joint assembly 210 illustrated, the first saddle bracket 218 has a saddle post 232 which rotatably, slidably engages a saddle passage 234 in the second saddle bracket 224. The saddle post 232 in turn has a joint passage 236 therethrough of sufficient size to accommodate cables and power cords needed to operate the audio visual system 200 without binding. A tie down bolt 238 which threadably engages the saddle post 232 extends over the second saddle bracket 224 and serves to secure the two saddle brackets (218, 224) with respect to each other. As the saddle brackets (218, 224) are rotated with respect to each other about the bracket rotation axis 230, the first pivot axis 222 is rotated with respect to the second pivot axis 228.

Preferably, blocking means are provided to limit the rotation between the saddle brackets (218, 224) to somewhat less than 360° to avoid undue twisting of the cables and/or the power cord passing therethrough. One simple blocking means can be provided by a first block 240 radially extending from the first saddle bracket 218 and a second block 241 which is mounted to the second saddle bracket 224 and is positioned to engage the first block 240 as the saddle brackets (218, 224) are rotated with respect to each other and thus limit rotation between the first saddle bracket 218 and the second saddle bracket 224.

The rigid arm segments 208 can be pivoted and rotated with respect to each other by applying a force sufficient to overcome the friction between one of the rigid arm segments 208 and its associated saddle bracket (218, 224). Once readjusted, the arm segments 208 are maintained in the new position by friction between the saddle brackets (218, 224) and their associated rigid arm segments 208. Similarly, rotation between the saddle brackets (218, 224) and the associated rotation between the arm segments 208 is provided by applying a twisting torque between the saddle brackets (218, 224) to overcome friction between the saddle brackets (218, 224).

The segmented arm 202 of this embodiment, while reducing the problems associated with springback that can occur when flexible conduits are used, still permits the arm 202 to traverse a non-planar path, because of the ability to change the orientations of the pivot axes (222, 228). Thus, the arm 202 can be configured so as to pass around obstacles. The arm 202 provides a continuous passage for accommodating cables and/or wiring. Such cables and or wiring can be threaded through the elements of the arm 202 either before or after the rigid arm segments 208 and the adjustable joint assemblies 210 have been assembled to form the arm 202.

As shown in FIG. 7, the housing bracket 216 of this embodiment is a hanging bracket that attaches to the housing 204 above a video display 242, rather than being a pedestal bracket such as the housing bracket 126 of the embodiment shown in FIG. 5. So positioning the housing bracket 216 has certain benefits in that it leaves a bottom surface 244 of the housing 204 (illustrated in FIG. 9) exposed so that lamps 246 can be mounted therein. These lamps 246 can then serve as a reading light, and are controlled by a switch 248. It is preferred that the switch 248 be a multiple pole switch which allows the powering of selected lamps 246, as well as selectively controlling the power to the video display 242 and to a first speaker assembly 250 and a second speaker assembly 252. Selectively powering the lamps 246 allows varying the intensity of the light produced.

Figure 9:
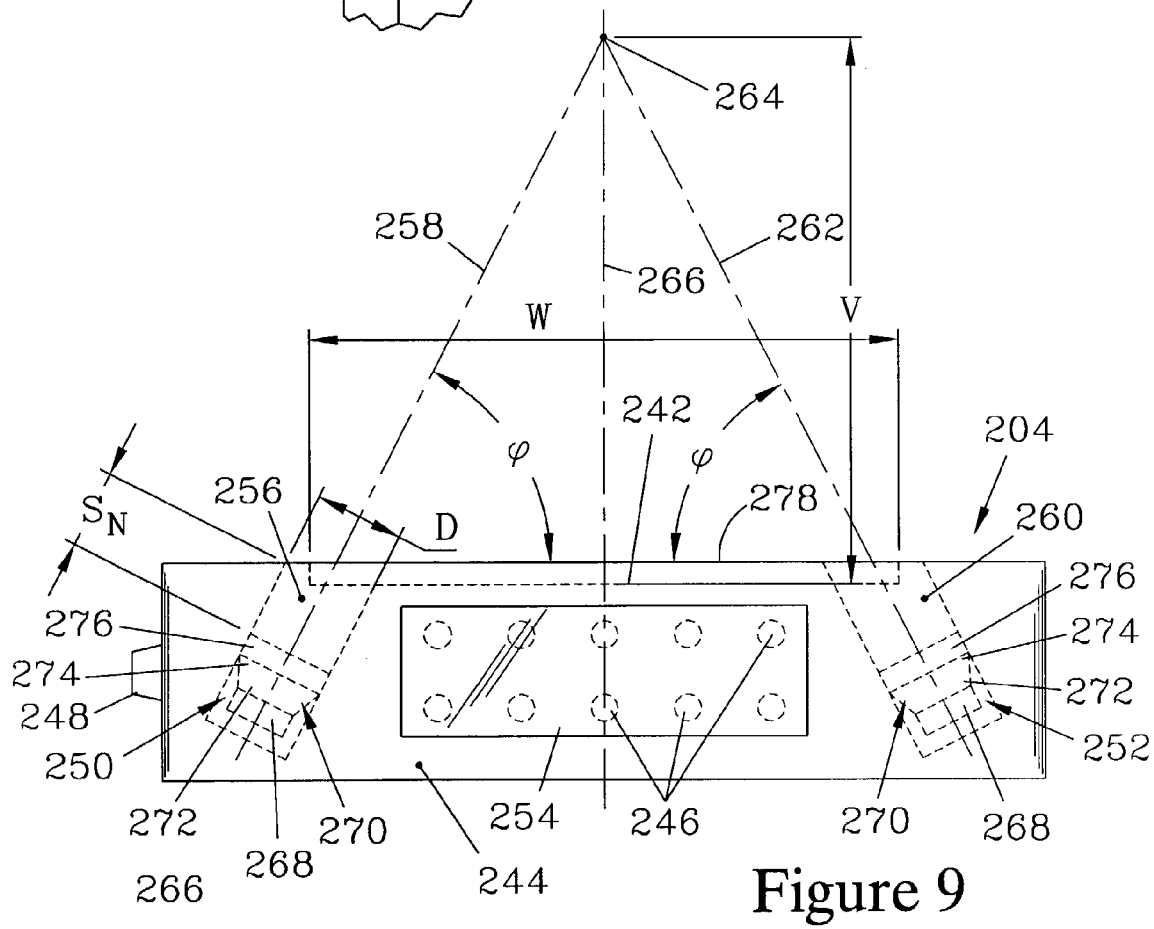
FIG. 9 is a view from plane 9-9 of FIG. 7 and illustrates a series of LED's mounted in the housing to provide a light source to allow the use of the audio visual system as a reading lamp. These LED's are controlled by a multiple-position switch that controls both the audio visual system and the reading lamp.

When an array of LED's are employed as the lamps 246 as illustrated in FIG. 9, the preferred lamps 246 are LED's each having an output of about 4-6 millicandellas emitted in a cone between 10° and 15°. The LED's are arranged in two rows and are mounted in the housing 204 behind a diffusing element 254. This arrangement creates a rectangular and conical pattern of light which is adequate for reading when spaced apart from the reading material a distance of about 12-24 inches (30-60 cm). When LED's are employed for the lamps 246, the intensity of light can be varied by changing the number of LED's which are illuminated and/or by pulsing the LED's to vary the amount of time that they are illuminated. Preferably the LED's are controlled to provide the user a choice of low, medium, or high intensity light.

Figure 10:
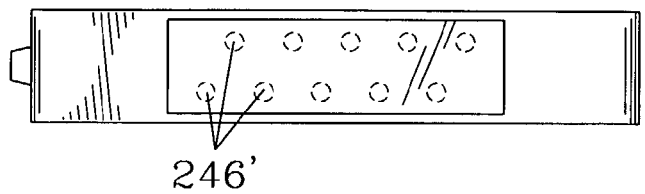
FIGS. 10 and 11 illustrate two examples of configurations of LED's that are alternatives to the configuration illustrated in FIG. 9, which provide a different distribution of the light from the reading lamp.
Figure 11:
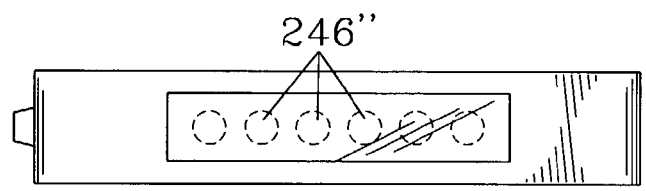

FIGS. 10 and 11 illustrate alternative LED configurations which could be employed as lamps 246 in the audio visual system 200. FIG. 10 illustrates an array of ten 5mm white LED's serving as lamps 246', which are essentially similar to the lamps 246 except for being positioned in staggered rows to provide a more uniform distribution of light. FIG. 11 shows lamps 246" that are formed by a single row of six 10 mm dual-chip white LED's.

Referring again to FIG. 9, the housing 204 also differs from the housing 102 of the embodiment illustrated in FIG. 7 in that it employs a first cylindrical speaker cavity 256, which has a first cavity axis 258 that is inclined with respect to the video display 242, and a second cylindrical cavity 260, which has a second cavity axis 262 that is also inclined with respect to the video display 242. The inclination φ for both of these speaker cavities (256, 260) is preferably the same and the cavity axes (258, 262) preferably intersect at a focal point 264. The cavity axes (258, 262) are preferably so positioned that the focal point 264 lies in a plane 266 which is normal to the video display 242 and which bisects a width W of the video display 242. The focal point 264 is spaced from the video display 242 by a viewing separation distance V that is preferably between about 12 inches and 36 inches, the inclination of the cavity axes (258, 262) being exaggerated in FIG. 9 for purposes of illustration.

This embodiment has particular utility in that, having the focal point 264 for the sound generated by the speaker assemblies (250, 252) so positioned complements the directional nature of the video display 242 and helps the user to properly locate himself/herself with respect to the video display 242 such that the eyes and ears of the user are symmetrically disposed with respect to the plane 266.

Each of the speaker assemblies (250, 252) has a driver 268 aligned with the associated cavity axis (258, 262), and a membrane 270 symmetrically disposed about the cavity axis (258, 262). Each membrane 270 terminates in a distal end 272 and a proximal end 274, with the distal end 272 being attached to the driver 268. The proximal end 274 is attached to a rim 276.

Each of the speaker assemblies (250, 252) is circular in cross section and has a rim diameter D. The speaker assemblies (250, 252) are designed to be mounted in the speaker cavities (256, 260) and are sized such that the rims 276 slidably engage the speaker cavities (256, 260). The tilting of the drivers 268 is effective in directing the higher frequencies, since these waves propagate with a large component of the energy being perpendicular to the membrane 270. However, while directing these higher frequency waves toward the listener could reduce the disturbances of these waves to others, reflection from nearby surfaces is still a concern, since the higher frequencies tend to be more directional, and do not disperse as quickly. More importantly, the listener perception of the sound is negatively affected from the inclined speaker placement, especially since minor head movement can drastically alter the listener perception of the program material. Dispersion of the lower frequency waves is reduced by positioning the rim 276 of the speaker assemblies (250, 252) set back from a front face 278 of the housing 204 by a nominal setback distance $S_N$ equal to 50% to 100% of the rim diameter D. This setback of the speaker assemblies (250, 252) limits the dispersion of the lower frequency sounds, thereby further reducing the disturbance of the sound to others. When the drivers 268 are tilted relative to the front face 278 of the housing 204, the nominal setback distance $S_N$ can be defined as the minimum distance from the rim 276 to the front face 278 as measured along the surface of the associated speaker cavity (256, 260). The distance from the rim 276 to the front face 278 varies, since the axes (258, 262) of the speaker cavities (256, 260) are not normal to the front face 278.

Figure 12:
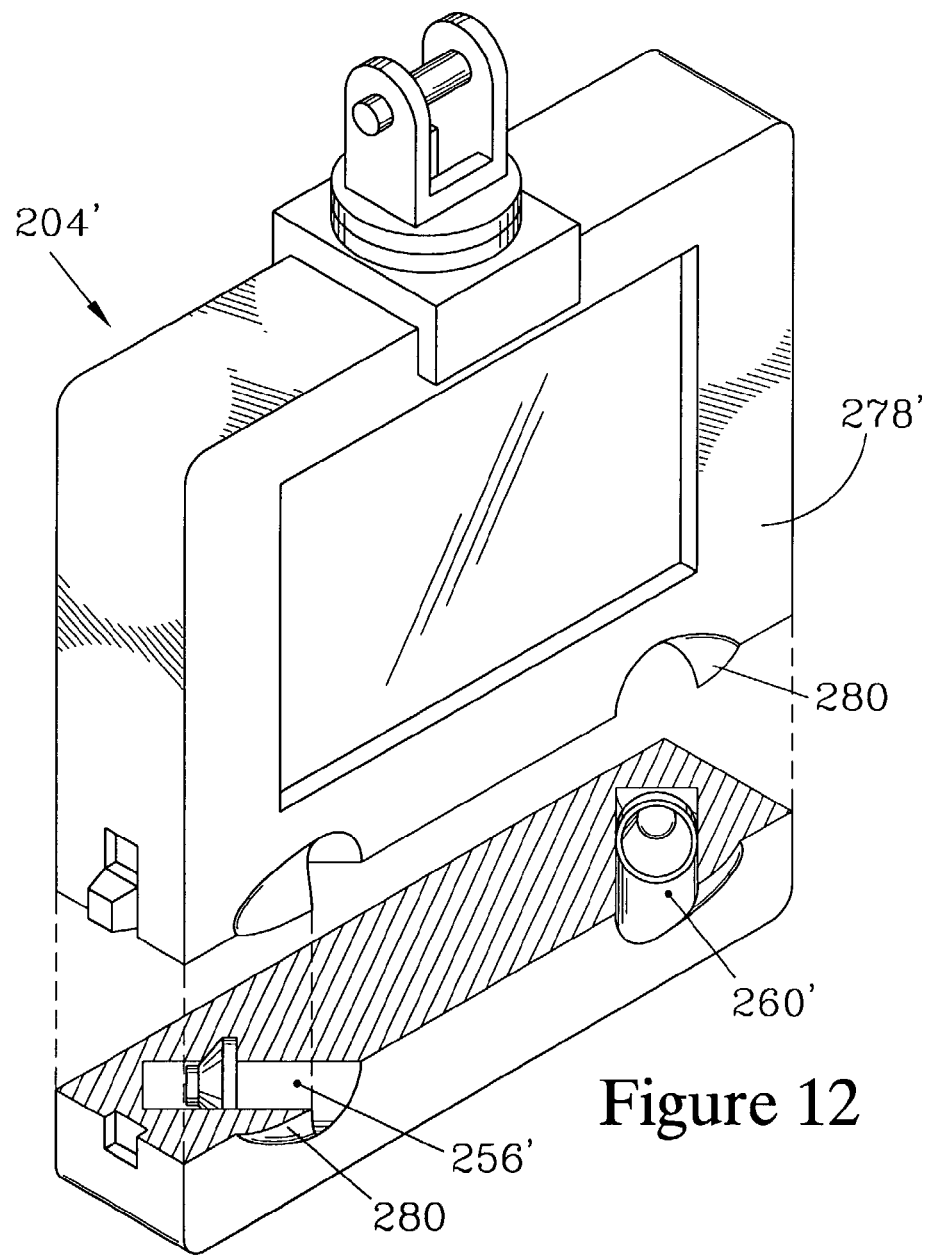
FIG. 12 is an isometric view of another embodiment of an audio visual display that shares many of the features of the embodiment illustrated in FIG. 7; however, the housing in this embodiment has hoods to reduce the radial dispersion of the lower frequency sound.

FIG. 12 is an isometric view of a housing 204' which differs from the housing 204 illustrated in FIGS. 7 and 9 in the details of the front face 278'. In the housing 204', the front face 278' differs in that the speaker cavities 256' and 260' are provided with hoods 280 which are positioned to further diminish the dispersion of the lower frequency sounds.

FIGS. 13 and 14 illustrate an alternative bi-pivotable adjustable joint assembly 300 which could be employed in an embodiment such as that illustrated in FIG. 7. The adjustable joint assembly 300 is shown exploded in FIG. 13 and assembled in FIG. 14. The adjustable joint assembly 300 again provides pivotal and rotational motion between two rigid arm segments 302, but also provides protection against exposure for cables and/or wires (not shown) passing through the adjustable joint assembly 300.

The adjustable joint assembly 300 has a first saddle bracket 304, which pivotably engages one of the rigid arm segments 302 and is mounted thereto by a first pivot bolt 306. A first pair of friction washers 308 are interposed between the rigid arm segment 302 and the first saddle bracket 304, and the first pivot bolt 306 can be tightened to compress the first pair of friction washers 308 to vary the frictional resistance to pivoting between the rigid arm segment 302 and the first saddle bracket 304. Similarly, a second saddle bracket 310 pivotably engages another of the rigid arm segments 302, and friction to resist pivoting is provided by a second pair of friction washers 312 and a second pivot bolt 314.

A flexible tube 316 has a joint passage 318 therethrough, which provides a conduit for cables and/or wiring. In FIG. 13, the flexible tube 316 is shown off to the side to more clearly show the structure of the various components of the adjustable joint assembly 300. The flexible tube 316 is sized to slidably engage a first bracket passage 320 in the first saddle bracket 304 and a second bracket passage 322 in the second saddle bracket 310. Interposed between the first saddle bracket 304 and the second saddle bracket 310 is a friction ring 324 having a friction ring passage 326 through which the flexible tube 316 also passes. The flexible tube 316 has a first bolt notch 328, configured to accommodate the first pivot bolt 306, and a second bolt notch 330, configured to accommodate the second pivot bolt 314. As the first saddle bracket 304 rotates relative to the second saddle bracket 310, the first bolt notch 328 and the second bolt notch 330 rotate with the saddle brackets (304, 310), twisting the flexible tube 316. While the flexible tube 316 is sufficiently elastic to accommodate some twisting due to rotation, this twisting may limit the rotation between the first saddle bracket 304 and the second saddle bracket 310.

The saddle brackets (304, 310) are attached together by a pair of bracket bolts 332. The bracket bolts 332 pass through bolt slots 334 in the second saddle bracket 310 and through bolt passages 336 in the friction ring 324, and threadably engage bolt receivers 338 in the first saddle bracket 304. Advancing the bracket bolts 332 in the bolt receivers 338 draws the first saddle bracket 304 and the second saddle bracket 310 together, compressing the friction ring 324 and increasing the frictional resistance to rotation between the first saddle bracket 304 and the second saddle bracket 310. The bolt slots 334 in the second saddle bracket 310, in combination with the bracket bolts 332, provide the means for rotatably engaging the first saddle bracket 304 with the second saddle bracket 310, and also provide blocking means to limit the rotation between the saddle brackets (304, 310). This limits twisting of the flexible tube 316 and any cables and/or wiring passing therethrough.

Figures 15, 16:
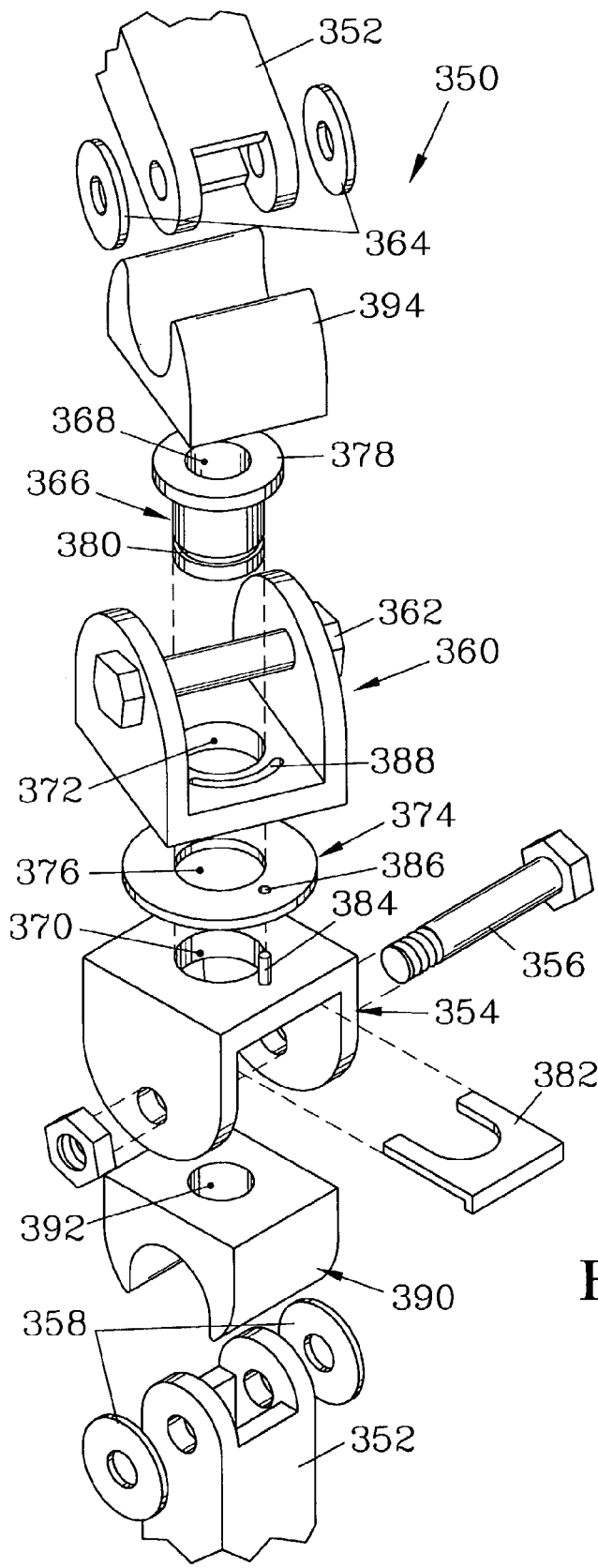
FIG. 15 is an exploded isometric view of another embodiment of a dual pivot axis adjustable joint of the present invention, which shares many features of the adjustable joint illustrated in FIGS. 13 and 14. This embodiment differs, in part, in the use of cowlings to assure that the cables are maintained within the joint. It also employs a quick release coupling for separation of two saddle brackets into which the arm segments are pivotally mounted.
FIG. 16 is a view of the adjustable joint of FIG. 15 when assembled.

FIGS. 15-21 illustrate another bi-pivotable adjustable joint assembly 350 which provides pivotal and rotational motion between two rigid arm segments 352, as well as providing protection against exposure for cables and/or wires passing through the adjustable joint assembly 350. FIG. 15 is an exploded view of the adjustable joint assembly 350, while FIG. 16 is an assembled view of the adjustable joint assembly 350.

The adjustable joint assembly 350 again has a first saddle bracket 354, which is pivotably attached to one of the rigid arm segments 352 by a first pivot bolt 356. A first pair of friction washers 358 are compressed between the rigid arm segment 352 and the first saddle bracket 354 as the first pivot bolt 356 is tightened to adjust the frictional resistance to pivoting between the rigid arm segment 352 and the first saddle bracket 354. A second saddle bracket 360 is pivotably attached to another of the rigid arm segments 352 by a second pivot bolt 362, and friction to resist pivoting is provided by a second pair of friction washers 364.

Figure 17:
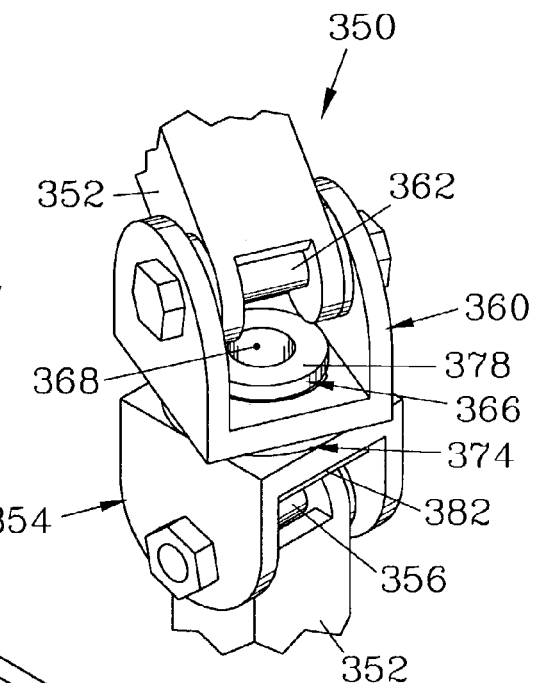
FIG. 17 illustrates the adjustable joint shown in FIGS. 15 and 16 assembled; however, in this view the cowlings are not shown.
Figure 18:
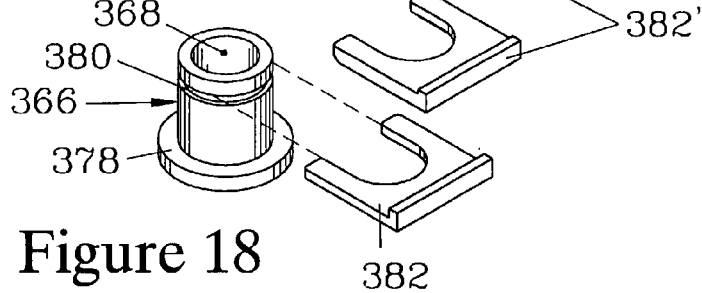
FIG. 18 illustrates the quick release coupling employed in the adjustable joint shown in FIGS. 15-17 when unassembled.
Figure 19:
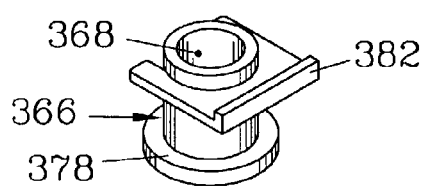
FIG. 19 illustrates the quick release coupling shown in FIG. 18 when assembled.
Figure 20:
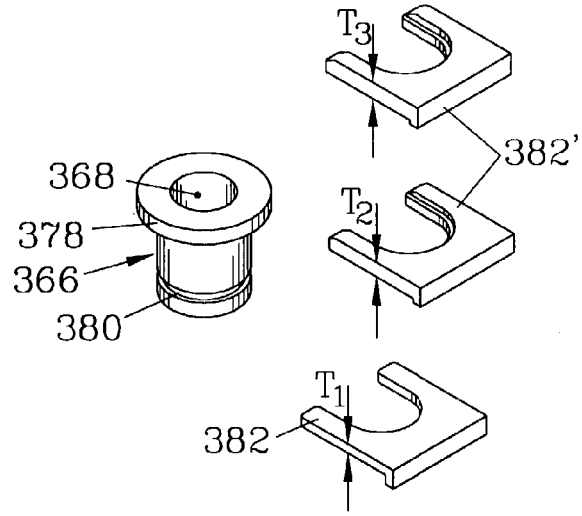
FIG. 20 illustrates the elements shown in FIG. 18 in an inverted position to more clearly show the structure of the alternative clips.

In this embodiment, a rigid tube 366 provides a conduit for cables and/or wiring, and serves to rotatably engage the first saddle bracket 354 and the second saddle bracket 360. In this embodiment, the rigid tube 366 also serves to attach the first saddle bracket 354 and the second saddle bracket 360 together. The rigid tube 366 has a joint passage 368 therethrough, and rotatably engages a first bracket passage 370 in the first saddle bracket 354 and a second bracket passage 372 in the second saddle bracket 360, shown in FIG. 15. Interposed between the first saddle bracket 354 and the second saddle bracket 360 is a friction ring 374 having a friction ring passage 376 through which the rigid tube 366 passes. The rigid tube 366 has a tube flange 378 and a clip notch 380, as best shown in FIG. 18. When the saddle brackets (354, 360) are pressed together with the friction ring 374 compressed therebetween, the rigid tube 366 is passed through the second bracket passage 372, the friction ring passage 376, and the first bracket passage 370 and is secured by a retainer clip 382 that slidably engages the clip notch 380 on the rigid tube 366, as shown in FIG. 19. As shown in FIG. 17, the retainer clip 382 and the tube flange 378 maintain the first saddle bracket 354 and the second saddle bracket 360 connected together, with a constant degree of compression on the friction ring 374 positioned therebetween.

The degree of friction between the saddle brackets (354, 360) could be adjusted by varying the thickness and/or the compressibility of the friction ring 374. However, to allow the degree of friction to be adjusted after the elements of the adjustable joint assembly have been strung onto wires and/or cables, it is preferred to provide alternative retainer clips 382' (shown in FIGS. 18 and 20) that can be substituted for the retainer clip 382 to adjust the degree of compression of the friction ring 374. While the retainer clips 382' are configured to engage the clip notch 380 of the rigid tube 366, they each have a greater effective thickness ($T_2$, $T_3$) than the thickness $T_1$ of the retainer clip 382. Due to this greater effective thickness ($T_2$, $T_3$), the retainer clips 382' draw the saddle brackets (354, 360) closer together when engaged with the clip notch 380, providing increased compression of the friction ring 374 and correspondingly greater friction between the saddle brackets (354, 360). A similar effect could be achieved by interposing a shim at some point between the retainer clip 382 and the tube flange 378 of the rigid tube 366.

Referring again to FIG. 15, a post 384 on the first saddle bracket 354 passes through a post passage 386 in the friction ring 372 and engages a slot 388 in the second saddle bracket 360. The post 384 and the slot 388 provide blocking means to limit the rotation between the saddle brackets (354, 360).

To protect any cables and/or wires from exposure, the first saddle bracket 354 is provided with a first cowling 390 having a first cowling passage 392 therethrough. The first cowling 390 is formed of a compressible and/or expandable material, and is configured to substantially fill open spaces in the first saddle bracket 354 as it pivots relative to the rigid aim segment 352, as shown in FIG. 16. Similarly, the second saddle bracket 360 is provided with a second cowling 394 of compressible and/or expandable material, having a second cowling passage (not shown) therethrough and configured to substantially fill open spaces in the second saddle bracket 360. The coverage provided by the first cowling 390 and the second cowling 394 can be appreciated by comparison between FIG. 16, where the cowlings (390, 394) are shown in place, and FIG. 17, where the cowlings (390, 394) are omitted to more clearly show the interaction of the tube flange 378 of the rigid tube 366 with the second saddle bracket 360.

FIG. 21 is an isometric view of an audio visual system 400 which has a housing 402 having a front face 404 and a directional video display 406 which is mounted in the front face 404. This embodiment has many features of earlier described dual speaker assembly audio visual systems. The housing 402 has a first speaker assembly 408 and a second speaker assembly 410 that are respectively mounted in a first speaker cavity 412 and a second speaker cavity 414 that extend to the front face 404. The first speaker cavity 412 has a first cavity axis 416, and the second speaker cavity 414 has a second cavity axis 418, the cavity axes (416, 418) being normal to the front face 404, as best shown in the section view of FIG. 22. The first speaker cavity 412 and the second speaker cavity 414 have many features in common with the speaker cavities 124 described above with reference to FIG. 6.

The audio visual system 400 differs from earlier embodiments, in part, in that the first speaker cavity 412 has a first cavity bevel 420 and the second speaker cavity 414 has a second cavity bevel 422. The bevels (420, 422) are positioned so that the cavities (412, 414) flare towards each other. The bevel angle α is adjusted in accordance with the geometry and the placement of the cavities (412, 414). In general, the angle α should be between about 30° and 50° from the cavity axis (416, 418), which in turn is normal to the front face 404. The particular angle α employed may depend on the size and shape of the driver of the speaker assemblies (408, 410) and/or on the screen aspect of the video display 406. For the typical sizes of video displays 406 employed, it is preferred to employ a range of 30° to 35° for the angle α when a 4:3 screen aspect is used, and a range of 45° to 50° is preferred when screen aspect of 16:9 is used. The speaker assemblies (408, 410) are preferably placed in line with the side edges of the video display 406.

Each of the bevels (420, 422) preferably has about the same curvature as the wall of the corresponding speaker cavity (412, 414), and the bevel (420, 422) and the speaker cavity (412, 414) preferably share a common chord as they intersect the front face 404. Preferably, this common chord is a diameter. The depth of the bevels is preferably limited such that the bevel terminates in front of the rim of the speaker assembly.

These limits and preferred geometries of the speaker cavities (412, 414) provide for some dispersion and interaction of the right channel and left channel audio material, which restores the stereo imaging and lessens the tubular acoustical coloration. The system still limits the outward, and otherwise off-axis acoustical dispersion, such that neighbors and nearby listeners are not disturbed.

Referring again to FIG. 21, the audio visual system 400 also has a different adjustable arm 424 than those discussed earlier. The adjustable arm 424 engages a base 426 and the housing 402. The adjustable arm 424 is fabricated from rigid arm segments that include an arm first segment 428, an arm second segment 430, an arm third segment 432, and an arm fourth segment 434. All of the arm segments (428, 430, 432, and 434) are provided with passages 436 therethrough which allow for the concealment of video and audio cables (not shown) and a power cord (also not shown) which provide power and signals to the housing 402. As discussed in greater detail below with regard to FIG. 30, this design also facilitates assembly and, more importantly, allows wires and/or cables to be passed through from the base 426 to the housing 402 without any splices or terminations, thereby maintaining a continuous shield, and preserving signal quality.

The arm first segment 428 terminates in an arm first end 438 and is rotatably mounted to the base 426. The arm first segment 428 is pivotably attached to the arm second segment 430 via a first hollow pivot joint 440 which has a cavity therein for passage of the cables and power cords therethrough. Examples of hollow pivot joints which could be employed are shown in FIGS. 24-27 and are discussed in greater detail below. The arm second segment 430 is also attached to a second hollow pivot joint 442 which has a cavity therein for passage of the cables and power cords therethrough. The second hollow pivot joint 442 also attaches to the arm third segment 432 and provides pivotal motion between the second arm segment 430 and the arm third segment 432. The arm third segment 432 in turn attaches to the arm fourth segment 434 via a third hollow pivot joint 444 to provide pivotal motion between the arm third segment 432 and the arm fourth segment 434. Again, a cavity is provided in the third hollow pivot joint 444 for passage of the cables and power cords therethrough. The arm fourth segment 434 terminates in an arm second end 446 that is rotatably mounted to the housing 402.

In this embodiment, the first hollow pivot joint 444 has a first joint central region 448 frictionally engaged with two first joint end caps 450. The arm first segment 428 is attached to the first joint central region 448, while the first joint end caps 450 are attached to the arm second segment 430. The arm second segment 430 of the embodiment illustrated is formed by a pair of second segment members 452, one of which is attached to each of the first joint end caps 450. Similarly, the second hollow pivot joint 442 has a second joint central region 454 and a pair of second joint end caps 456. The second segment members 452 of the arm second segment 430 are attached to the second joint central region 454, while the arm third segment 432 is attached to the second joint end caps 456. The third arm segment 432 is also formed by a pair of spaced-apart third segment members 458, one of which is attached to each of the second joint end caps 456. The third hollow pivot joint 444 has third joint end caps 460, to which the third segment members 458 are attached, and a third joint central region 462, to which the arm fourth segment 434 is attached.

This design has particular utility since the paired arm elements of the second arm segment 430 and the third segment 432 restrict the rotational freedom of these arm segments with respect to each other to avoid excessive twisting of the wires and cables passing therethrough. Furthermore, if the third segment members 458 are spaced apart by an arm member separation A that is maintained substantially less than a breadth B of the housing 402, then the pair of third segment members 458 reduce the likelihood of inadvertent twisting that might otherwise result from movement of the third hollow pivot joint 444.

The adjustable arm 424 allows the video display 406 to be positioned appropriately for viewing by the user. While frictional engagement between the joint central regions (448, 454, 462) and the end caps (450, 456, 460) of the hollow pivot joints (440, 442, 444) can be sufficient to maintain the adjustable arm 424 in the desired position, it may be advantageous to connect a tension spring 464 between the first joint central region 448 of the first hollow pivot joint 444 and the second joint central region 454 of the second hollow pivot joint 442 to counteract forces due to the weight of the housing 402 and the arm 424 on the arm second segment 430.

Figure 23:
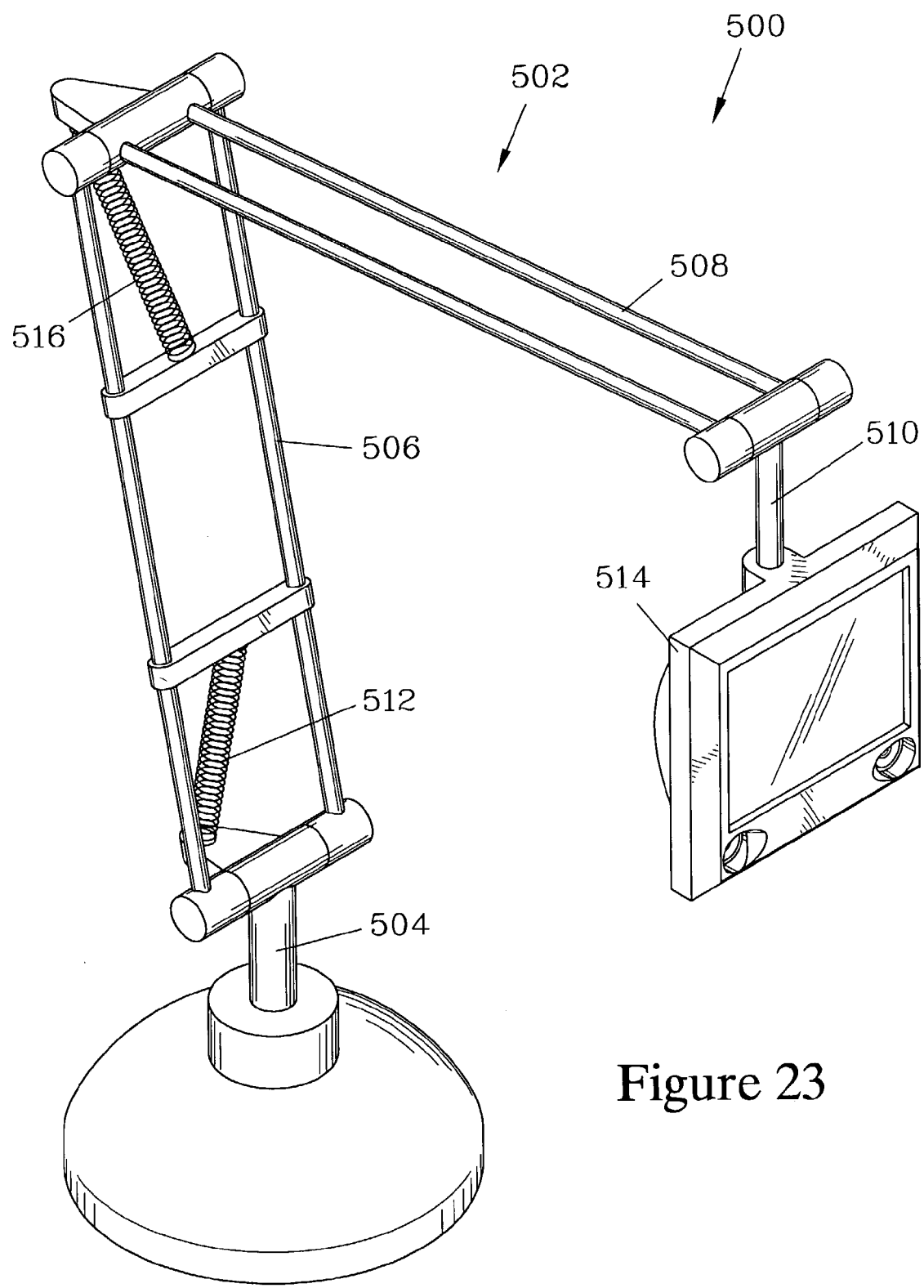
FIG. 23 is an isometric view illustrating another embodiment of an audio visual system of the present invention which employs an adjustable arm similar to that shown in FIG. 21 to support an audio visual display. However, the adjustable arm of this embodiment employs two springs to counter the weight of the audio visual display, one spring serving to bias the arm segment to which it is connected against motion toward the audio visual display, and the other spring serving to bias an adjacent arm against the downward force of the audio visual display.

FIG. 23 illustrates an audio visual system 500 which shares many features in common with the audio visual system 400 discussed above. The audio visual system 500 again has an adjustable arm 502 having a first arm segment 504, a second arm segment 506, a third arm segment 508, and a fourth arm segment 510, but differs in the particular configuration of the adjustable arm 502 and the biasing of various arm elements. The adjustable arm 502 employs a first spring 512, which biases the second arm segment 506 against the moment created by the third arm 508, the fourth arm 510 and a housing 514. The arm 502 also has a second spring 516 which biases the movement of the third arm segment 508 against the weight of the housing 514. Both the first spring 512 and the second spring 516 of this embodiment are connected to the arm second segment 506. It should be appreciated by one skilled in the art that other configurations would be possible.

Figure 24:
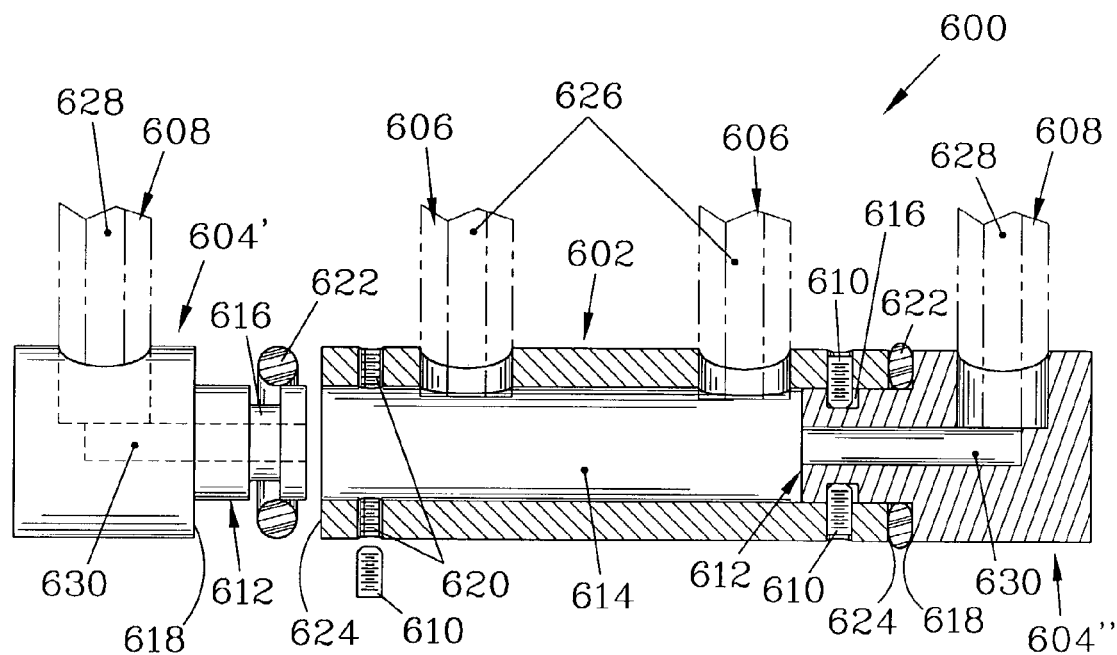
FIGS. 24 through 27 are section views that illustrate various pivot joints which are suitable for use connecting together arm segments in the embodiments illustrated in FIGS. 21 and 23, and which allow adjustment of the frictional force required to pivot adjacent arm segments relative to each other.

FIG. 24 illustrates one embodiment of a pivot joint 600 which could be employed in audio visual systems such as those shown in FIGS. 21 and 23, and illustrates the connection of passages in the arm segments to allow cables and/or wires to pass therethrough. The pivot joint 600 has a joint central region 602 positioned between a pair of joint end caps (604' and 604"). The joint central region 602 is affixed to a first pair of arm members 606 (shown in phantom), while the joint end caps (604' and 604") are affixed to a second pair of arm members 608 (also shown in phantom).

The joint end cap 604' is shown prior to engagement with the joint central region 602, while the joint end cap 604" is shown after it has been engaged with the joint central region 602 and secured thereto by a number of set screws 610. Each of the joint end caps (604' and 604") has an insert portion 612 which is sized to slidably and rotatably engage a central passage 614 of the joint central region 602. The insert portion 612 has a securing groove 616 and terminates at an annular end cap bearing surface 618 on the joint end cap 604. The joint central region 602 has a number of screw passages 620, each of which threadably receives one of the set screws 610. When the insert portion 612 of the joint end cap 604 is forcibly inserted into the central passage 614 to align the securing groove 616 with the screw passages 620, deforming an O-ring 622, the set screws 610 can be advanced to engage the securing groove 616 to maintain the joint end cap 604 engaged with the joint central region 602 with the O-ring 622 compressed therebetween.

The joint central region 602 has a pair of central region bearing surfaces 624, each opposed to one of the end cap bearing surfaces 618 when the insert portion 612 of the joint end cap 604 is inserted into the central passage 614. The O-rings 622 are interposed between each of the central region bearing surfaces 624 and the opposing end cap bearing surface 618. The O-ring 622 is a compressible element which is resiliently compressed between the central region bearing surface 624 and the end cap bearing surface 618 when the insert portion 612 is advanced into the central passage 614 to align the securing groove 616 with the screw passages 620. The compression of the O-ring 622 causes it to forcibly engage both the central region bearing surface 624 and the end cap bearing surface 618 to provide friction between the joint end caps 604 and the joint central region 602 to resist rotation therebetween. The degree of friction between the joint end caps 604 and the joint central region 602 can be adjusted by varying the thickness and/or compressibility of the O-rings 622 with respect to the separation between the end cap bearing surfaces 618 and the central region bearing surfaces 624. However, this does not allow for adjusting the degree of friction in the joint after the elements have been strung onto wires and/or cables.

The first pair of arm members 606 of this embodiment are both formed as tubular members, each having a first arm member passage 626 that communicates with the central passage 614 of the joint central region 602. Similarly, the second pair of arm members 608 are also formed as tubular members, each having a second arm member passage 628. Each of the joint end caps 604 has an end cap passage 630 that communicates between one of the second arm member passages 628 and the central passage 614. Thus, cables (not shown) can be passed through the second arm member passages 628, the end cap passages 630, the central passage 614, and the first arm member passages 626 to allow power and/or media output signals to be transmitted through the pivot joint 600. While the pivot joint 600 illustrated provides two separate paths for cables to be run, it should be appreciated that in some applications only a single path may be required. The pivot joint 600 is well suited to stringing the wires through the components of the arm before assembly; however, as noted, the degree of friction in the pivot joint 600 cannot be subsequently adjusted.

Figure 25:
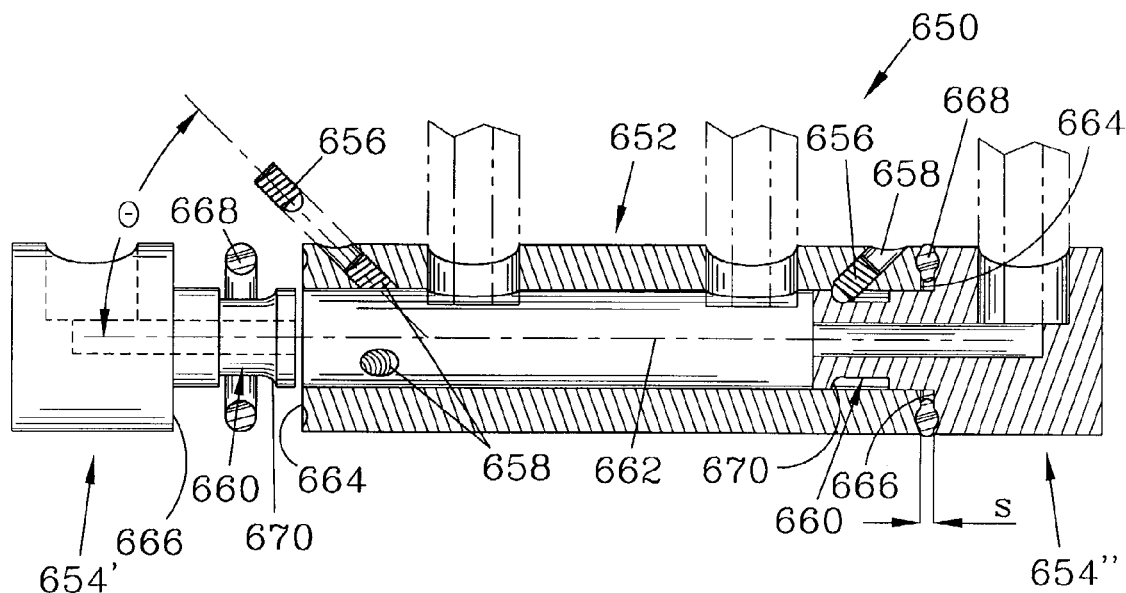

FIG. 25 illustrates a pivot joint 650 which shares many features in common with the pivot joint 600 discussed above. However, the pivot joint 650 allows the frictional resistance to pivoting to be readily adjusted by the user, without requiring any substitution of parts. The pivot joint 650 again has a joint central region 652 and a pair of joint end caps (654' and 654") which are slidably and rotatably engaged with the joint central region 652. The joint end caps (654' and 654") are maintained in the joint central region 652 by a number of set screws 656 that are threadably advanced in screw passages 658 in the joint central region 652. The set screws 656 engage grooves 660 in the joint end caps (654' and 654"), as shown for the joint end cap 654". In the pivot joint 650, the screw passages 658 are inclined to a longitudinal axis 662 by an angle θ which is preferably about 45°.

The joint central region 652 of this embodiment has a pair of central region bearing surfaces 664. Each of the joint end caps 654 has an end cap bearing surface 666. Interposed between the central region bearing surfaces 664 and the end cap bearing surfaces 666 are O-rings 668. When the set screws 656 are advanced in the screw passages 658, the set screws 656 forcibly engage a lead sidewall 670 of the groove 660 and thereby reduce a separation s between the central region bearing surface 664 and the end cap bearing surface 666, compressing the O-ring 668. The torsional load required to rotate the joint end caps 654 relative to the joint central region 652 is proportional to the compression of the O-rings 668, and thus can be adjusted by adjusting the position of the setscrews 656. The pivot joint 650 is also well suited to stringing the wires through the components of the arm before assembly. Furthermore, this design allows the torsional friction to be readily adjusted after the arm has been assembled.

Figure 26:
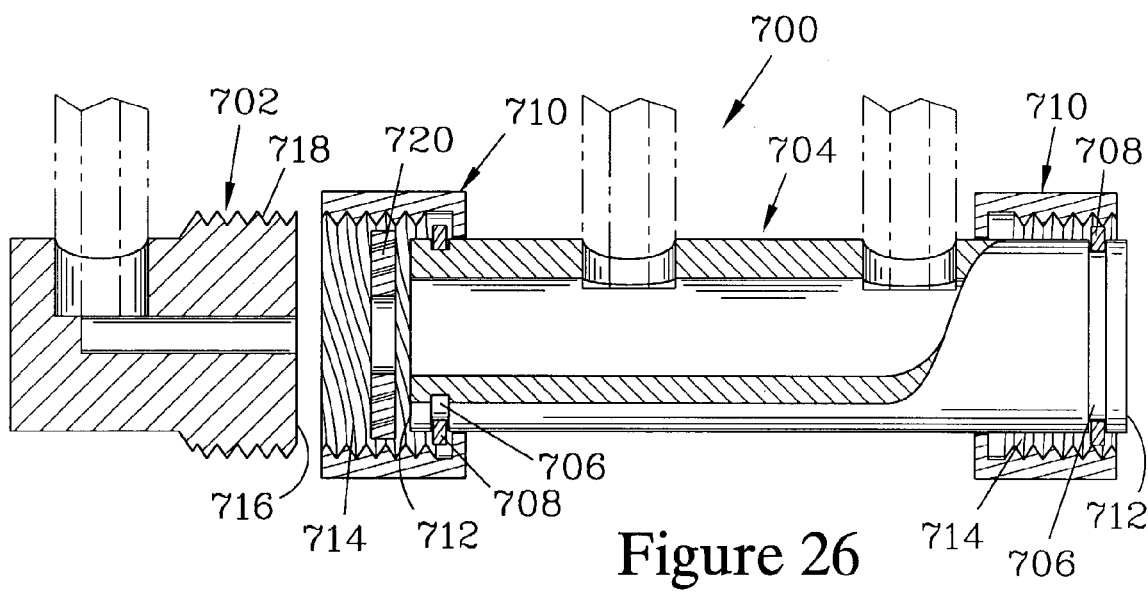
Figure 27:
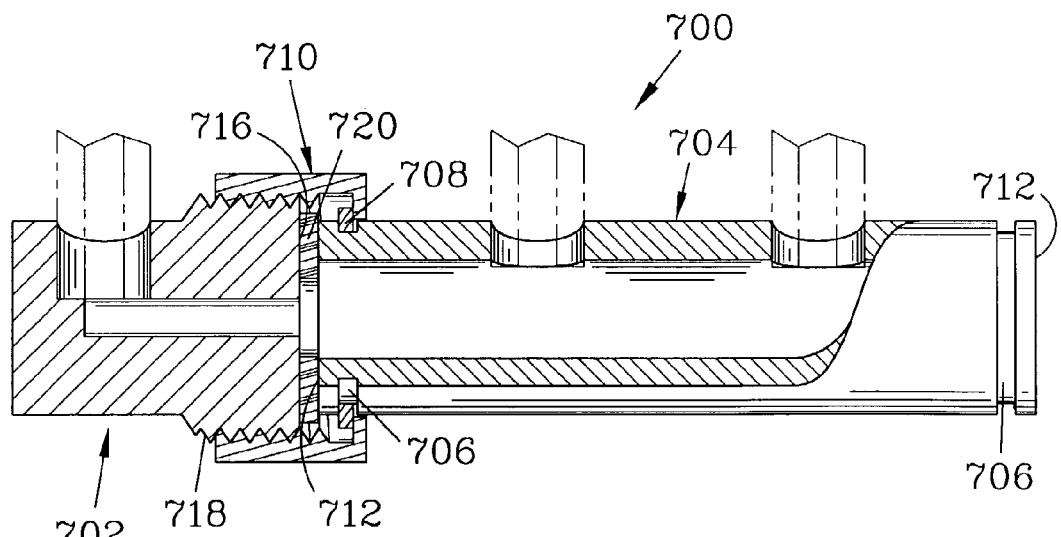

FIGS. 26 and 27 illustrate a pivot joint 700 which provides a different scheme for threadably securing a pair of joint end caps 702, only one of which is shown, to a joint central region 704. The joint central region 704 has a pair of grooves 706, each configured to accept a retaining clip 708 which is rotatably restrained therein. A pair of joint couplers 710 are provided (only one being shown in FIG. 27), each of the joint couplers 710 slidably and rotatably engaging the joint central region 704 and being retained thereon by one of the retaining clips 708. The joint central region 704 terminates at a pair of central region bearing surfaces 712. The joint couplers 710 each have female screw threads 714.

The joint end cap 702 has an end cap bearing surface 716 and male screw threads 718. The male screw threads 718 are configured to threadably mate with the female screw threads 714 of the joint coupler 710. When so mated, the end cap bearing surface 716 is opposed to one of the central region bearing surfaces 712. A compressible washer 720, shown in FIG. 26 in an uncompressed state, is interposed between the end cap bearing surface 716 and the central region bearing surface 712. As the male screw threads 718 of the joint end cap 702 are threadably advanced in the female screw threads 714 of the joint coupler 710, the joint coupler 710 becomes forcibly engaged with the retaining clip 708, which in turn forcibly engages the groove 706 in which it resides. This forcible engagement allows the compressible washer 720 to be forcibly compressed between the end cap bearing surface 716 and the central region bearing surface 712 to frictionally engage the joint end cap 702 with the joint central region 704, as shown in FIG. 27. The degree of friction between the joint end cap 702 and the joint central region 704 can be adjusted by tightening or loosening the joint coupler 710. This embodiment is also well suited for pre-stringing the parts of the arm before assembly.

Figure 28:
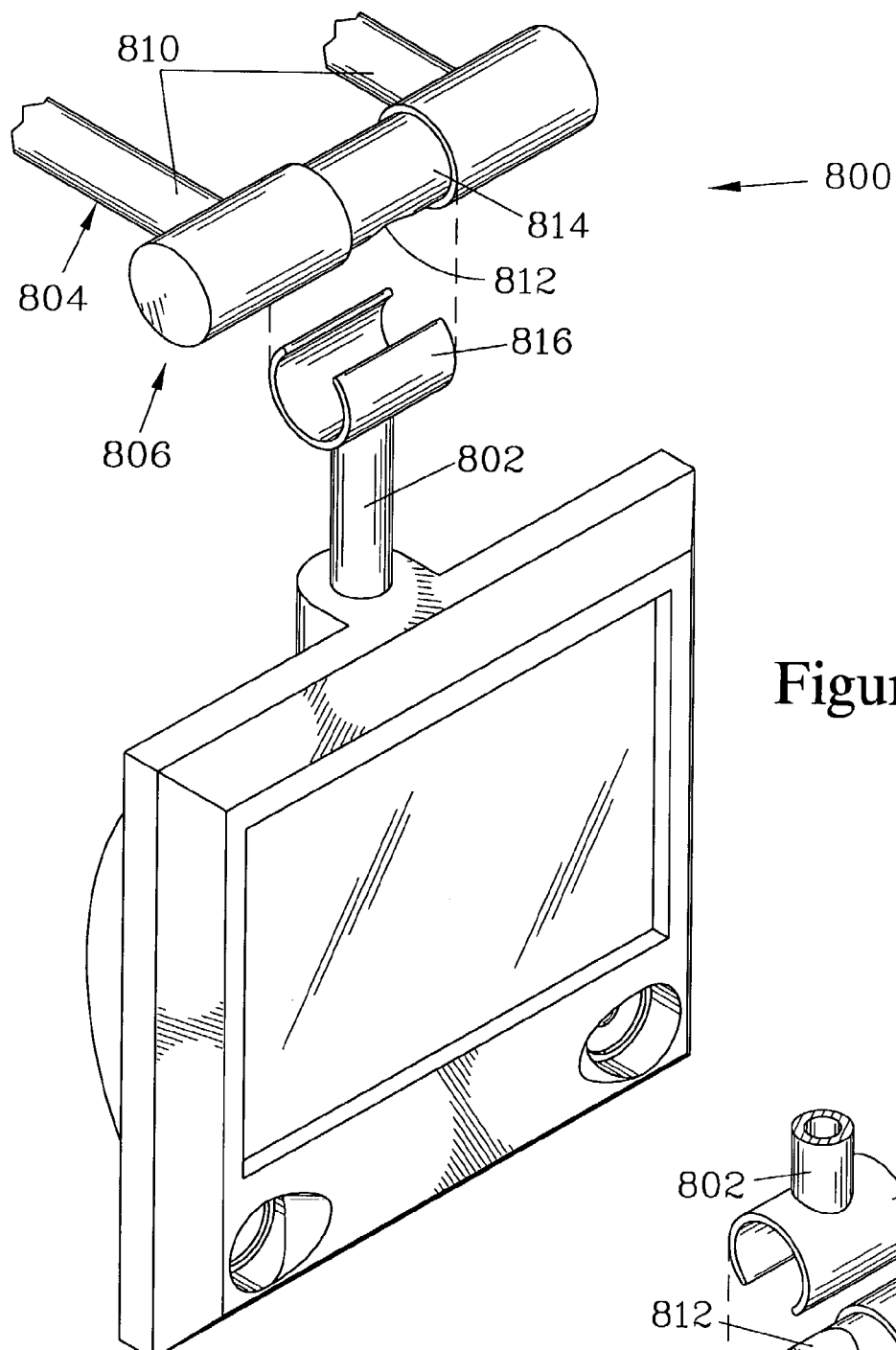
FIGS. 28 and 29 are isometric views that illustrate a connector for pivotally attaching a housing to an arm segment which can be employed in the embodiments illustrated in FIGS. 21 and 23.
Figure 29:
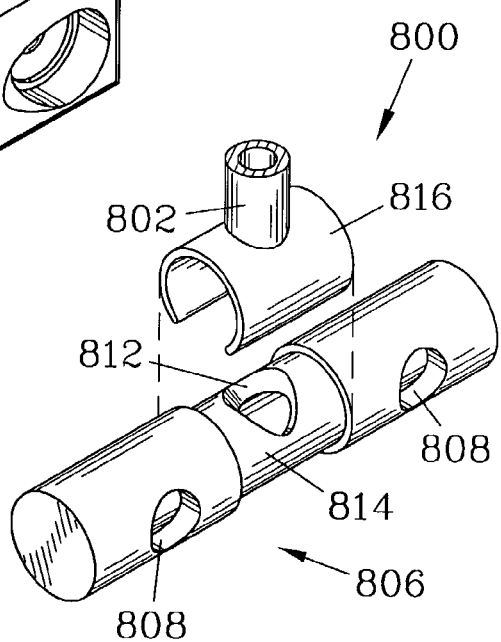

FIGS. 28 and 29 illustrate an alternate pivot joint 800 for connection between a fourth arm segment 802 and a third arm segment 804. In this embodiment, a hollow barrel member 806 serves as one element of the pivot joint 800 and has a pair of spaced apart openings 808 (shown in FIG. 29) for insertion of two arm members 810 that collectively form the third arm segment 804. The hollow barrel member 806 also has a central opening 812 (best shown in FIG. 29) located between the spaced apart openings 806. Preferably, the barrel member 806 has a central portion 814 having a reduced cross section in which the central opening 812 is located. A C-clip 816 snaps onto the barrel member 806 to become frictionally, rotatably engaged therewith. When the barrel member 806 has a central portion 814 having a reduced cross section, the C-clip 816 attaches onto the central portion 814. The C-clip 816 can have a passage therethrough for insertion of the fourth arm segment 802, or could be formed integrally therewith.

Figure 30:
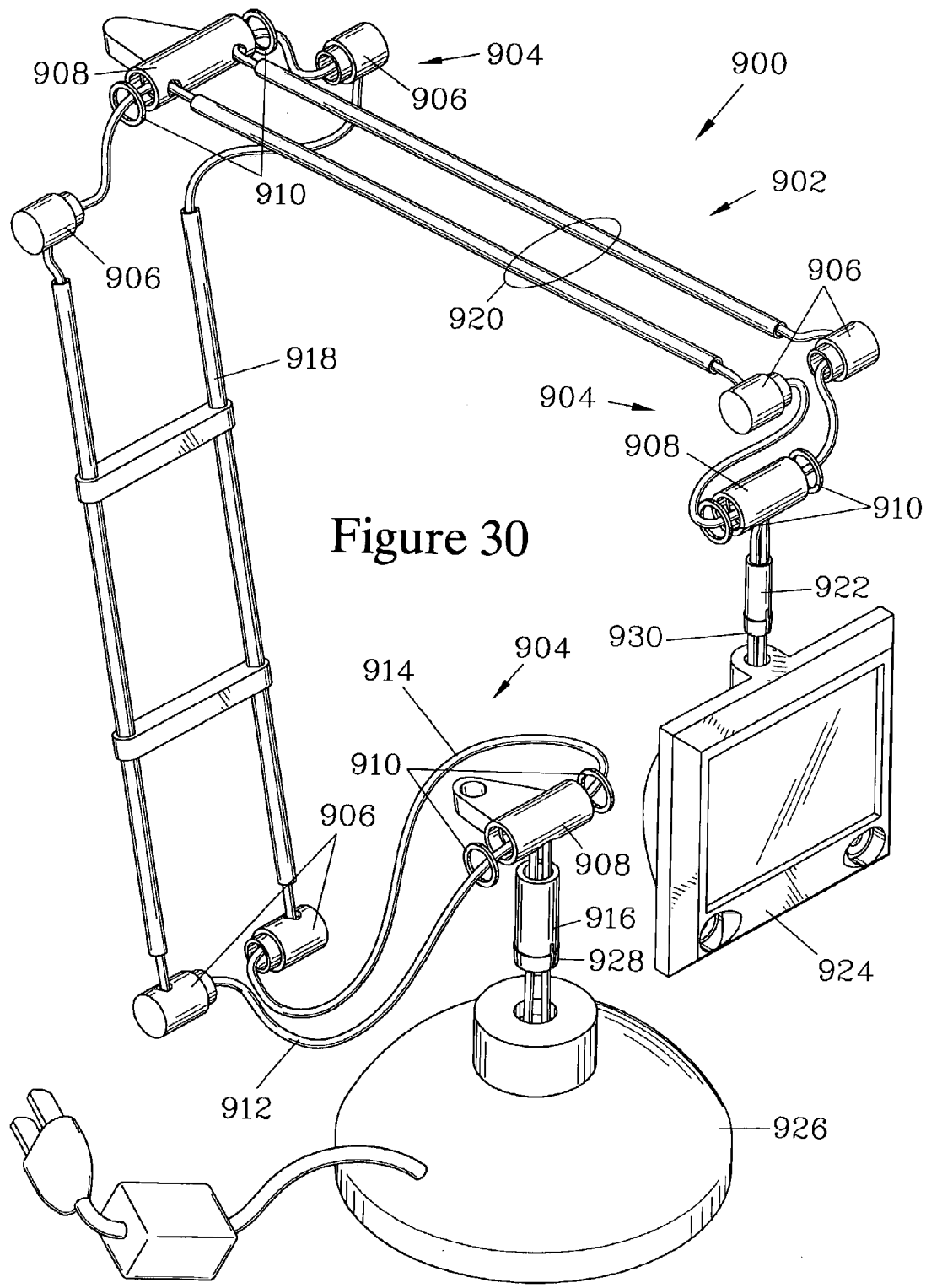
FIG. 30 is an exploded view of the embodiment shown in FIG. 23, showing the components of the arm assemblies being strung thereon, but before the arm elements have been assembled.

FIG. 30 is an exploded isometric view of an audio visual system 900, which is substantially similar to the audio visual system 500 and has an adjustable arm 902 that employs pivot joints 904 of the type illustrated in either FIG. 24 or FIG. 25. The pivot joints 904 each have a pair of end caps 906 that, when the pivot joint 904 is assembled, rotatably engage a central joint element 908 with friction washers 910 positioned therebetween.

To facilitate assembly of the audio visual system 900, it is preferred for the elements of the adjustable arm 902 to be strung onto a power cord 912 and a signal cable 914 prior to assembly. If the pivot joints 904 are of the type illustrated in FIG. 24, the adjustment of the degree of friction in the pivot joints 904 must be made before assembly if the power cord 912 and the signal cable 914 are to be strung through the adjustable arm 902. For this reason, the pivot joints 904 are preferably of the type illustrated in FIG. 25 so as to provided ease in adjustment when the audio visual system 900 is in service. It should be appreciated that pivot joints of the type illustrated in FIGS. 26 and 27 would also be well suited for stringing onto cables and/or wiring prior to assembly.

As can be seen, the power cord 912 and the communication cable 914 can be strung through an arm first segment 916, an arm second segment 918, an arm third segment 920 and an arm fourth segment 922, as well as through the end caps 906, the friction washers 910, and the central joint elements 908. Once the power cord 912 and the communication cable 914 have been strung through the respective elements of the adjustable arm 902, the arm segments (916, 918, 920, 922) can be affixed to the respective elements of the pivot joints 904 and the pivot joints 904 then assembled.

In this embodiment, all arm segments (916, 918, 920, 922) are constructed from tube stock with the arm first segment 916 and the arm fourth segment 922 being constructed with single tubes having larger diameters so as to allow them to readily accommodate both the power cord 912 and the communication cable 914 without creating interference between them. It is further preferred that the arm first segment 916 and the arm fourth segment 922 be relatively short to reduce crosstalk between the power cord 912 and the communication cable 914. Preferably, the lengths of the arm segments (916, 918, 920, 922) are selected such that the audio visual system 900 can be folded for storage with a housing 924 positioned directly above a base 926. One way that this can be readily achieved is by making the arm first segment 916 somewhat longer than the arm fourth segment 922. It is also preferred for the arm first segment 916 to have a greater cross section than the arm fourth segment 922 for improved appearance and to provide stability for the adjustable arm 902. The adjustable arm 902 terminates in an arm first end 928 and arm second end 930, both of which are preferably configured with rotational snap interfaces that are designed to snap respectively into the base 926 and the housing 924 of the audio visual system 900.

While the novel features of the present invention have been described in terms of particular embodiments and preferred applications, it should be appreciated by one skilled in the art that substitution of materials and modification of details obviously can be made without departing from the spirit of the invention.

I claim:

1. An improved audio visual system having,
a housing having a front face that is substantially planar,
a LCD video display with a substantially planar display surface mounted in the front face, the video display being bounded by side edges and top and bottom edges,
a first speaker assembly and a second speaker assembly, each of the speaker assemblies being mounted in the housing for generating sound, each of the speaker assemblies having,
a driver having a driver axis that is substantially perpendicular to the front face of the housing,
a membrane symmetrically disposed about the driver axis, the membrane terminating in a distal end attached to the driver, and a proximal end, the proximal end having a greater cross section than the distal end, the membrane having a nominal diameter at the proximal end, and
a rim attached to the proximal end of the membrane, and
a first speaker cavity for the first speaker assembly and a second speaker cavity for the second speaker assembly, the improved audio visual system being designed for personal use without disturbing those around the user, the improvement comprising:
each of the speaker cavities intersecting the front face of the housing and having a cavity bottom positioned with respect to the front face so as to define a cavity depth which is sufficient in size to accommodate one of the speaker assemblies while providing a free volume therebehind adequate to assure a responsive speaker assembly and a separation between said cavity bottom and the driver, wherein said cavity depth is less than about twice the nominal diameter of the membrane at the proximal end,
the rim of each of the speaker assemblies being positioned in the cavity so as to establish a setback distance from the front face of the housing, wherein said setback distance is 50% to 100% of the nominal diameter at the proximal end; and
further wherein and each of the speaker cavities terminates at the substantially planar front face;
still further wherein each of the cavities is sized at least as large as the cross section of the membrane throughout the portion of the cavity extending between the rim of the speaker assembly and the front face of the housing; and
further wherein the first speaker cavity has a first bevel that intersects the front face of the housing and is configured such that it extends the first speaker cavity toward the second speaker cavity as the first speaker cavity advances to and intersects the front face of the housing;
and further wherein the second speaker cavity has a second bevel that intersects the front face of the housing and is configured such that it extends the second speaker cavity toward the first speaker cavity as the second speaker cavity advances to and intersects the front face of the housing.

2. The improved audio visual system of claim 1 wherein said first bevel and said second bevel are inclined with respect to the driver axes by an angle $\alpha$ of between about 30° and 50°.

3. The improved audio visual system of claim 1 wherein the audio visual system is designed to interface with an entertainment system that generates various media output signals, the audio visual system further comprising:
a base;
means for attaching said base to the housing so as to provide articulation of the housing with respect to said base; and
means for transmitting the media output signals to the LCD video display and to the first speaker assembly and the second speaker assembly residing in the housing.

4. The improved audio visual system of claim 3 wherein said means for attaching said base to the housing so as to provide articulation of the housing with respect to said base further comprises:
a housing bracket for supporting the housing; and
an adjustable arm having,
  at least two rigid arm segments,
  joints between said at least two rigid arm segments, at least one of said joints being a pivotal joint, and
  means for adjusting the torsional load bearing capacity of said joints, said adjustable arm terminating in an arm first end and an arm second end, said arm first end connecting to said base and said arm second end connecting to said housing bracket,
  whereby said means for adjusting the torsional load bearing capacity of said joints allows setting the torsional load bearing of said joints to such a level that the position of the housing can be readily adjusted with respect to said base and the housing remains in place when so positioned.

5. The improved audio visual system of claim 4 wherein the housing has a top surface and a bottom surface and said housing bracket attaches to the top surface of the housing, and further wherein the audio visual system further comprises:
LED lamps on the bottom surface of the housing; and
a switch for selectively activating said LED lamps to allow varying the intensity of light produced by said LED lamps.

6. The improved audio visual system of claim 4 wherein said arm segments have arm passages therethrough, and said joints have joint passages therethrough which provide communication between said arm passages to accommodate said means for transmitting the media output signals to the LCD video display and to the first and second speaker assemblies.

7. The improved audio visual system of claim 6 wherein, for at least one of said joints, said means for adjusting the torsional load bearing capacity of said joints further comprises:
a first joint element;
a second joint element, said first and second joint elements being mounted so as to pivot with respect to each other about a common pivot axis;
a friction element positioned between said first joint element and said second joint element; and
means for varying the force of engagement of said first joint element and said second joint element with said friction element, thereby varying the torsional load bearing capacity of said joint.

8. The improved audio visual system of claim 7 wherein, said first joint element is provided by a joint central region attached to one of said rigid arm segments,
further wherein said second joint element is provided by a pair of joint end caps attached to another of said rigid arm segments, said joint central region rotatably engaging said pair of end caps,
still further wherein said friction element is provided by a pair of resilient rings, each positioned between one of said end caps and said joint central region, and
yet further wherein said means for varying the force of engagement of said first joint element and said second joint element with said friction element is provided by means for varying the position of each of said pair of joint end caps with respect to said joint central region so as to vary the compression of said resilient ring.

9. The improved audio visual system of claim 6 wherein said joints are dual pivoting joints and further wherein, for each of said dual pivoting joints, said means for adjusting the torsional load bearing capacity of said joints further comprises:
a first saddle bracket frictionally engaging and pivotably attaching to one of said arm segments, said first saddle having a first pivot axis, about which said one of said arm segments pivots, and a first bracket passage;
means for varying the force of engagement of said first saddle bracket with said one of said arm segments attached thereto;
a second saddle bracket frictionally engaging and pivotably attaching to another of said arm segments, said second saddle bracket having a second pivot axis, about which said another of said arm segments pivots, and a second bracket passage communicating with said first bracket passage;
means for varying the force of engagement of said second saddle bracket with said another of said arms attached thereto;
a bracket rotation axis about which said first saddle bracket and said second saddle bracket can rotate with respect to each other;
means for rotatably and frictionally engaging said first saddle bracket with said second saddle bracket so as to allow relative rotation therebetween about said bracket rotation axis; and
means for varying the force of the frictional, rotatable engagement of said first saddle bracket with said second saddle bracket.

10. The improved audio visual system of claim 5 wherein said switch also selectively activates power to the LCD display and the speaker assemblies.

11. The improved audio visual system of claim 5 wherein said switch can selectively activate said LED lamps to provide at least,
an OFF level of illumination where none of said LED lamps are illumniated;
a LOW level of illumination where less than all of said LED lamps are illuminated;
a HIGH level of illumination where all of said LED lamps are illuminated.

12. An audio visual system comprising:
a housing having a front face that is substantially planar;
a LCD video display with a substantially planar display surface mounted in said front face, said video display being bounded by side edges and top and bottom edges, said LCD video display being a directional display that can only be viewed by a user when the line of vision of the user is no more than about 25° from normal to said substantially planar display surface;
a first speaker assembly and a second speaker assembly, each of said speaker assemblies for generating sound being mounted in said housing, each of said speaker assemblies having,
  a driver having a driver axis that is substantially perpendicular to said front face of said housing,
  a membrane symmetrically disposed about said driver axis, said membrane terminating in a distal end attached to said driver, and a proximal end, said proximal end having a greater cross section than said distal end, said membrane having a nominal diameter at said proximal end, and
  a rim attached to said proximal end of said membrane; and
further wherein, said first speaker assembly is provided with a first speaker cavity and the second speaker assembly is provided with a second speaker cavity, each of said speaker cavities terminating at and intersecting said front face of said housing and having a cavity bottom positioned with respect to said front face so as to define a cavity depth which is sufficient in size to accommodate said speaker assembly while providing a free volume therebehind adequate to assure a responsive speaker assembly and a separation between said cavity bottom and said driver, said rim of said speaker assembly being positioned in said cavity so as to establish a setback distance from said front face of said housing wherein said setback is 50% to 100% of the nominal diameter at said proximal end, said first speaker cavity having a first bevel that is inclined with respect to said driver axis of said first speaker assembly and which intersects said front face of said housing, said first speaker cavity being configured such that it extends said first speaker cavity toward said second speaker cavity as said first speaker cavity advances to and intersects said front face of said housing, and said second speaker cavity having a second bevel that is inclined with respect to said driver axis of said second speaker assembly and which intersects said front face of said housing, said second speaker cavity being configured such that it extends said second speaker cavity toward said first speaker cavity as said second speaker cavity advances to and intersects said front face of said housing.

13. The audio visual system of claim 12 wherein said bevels are inclined with respect to said driver axes by an angle a of between about 30° and 5°.

14. The audio visual system of claim 12 wherein the audio visual system is designed to interface with an entertainment system that generates various media output signals, the audio visual system further comprising:
 a base;
 means for attaching said base to said housing so as to provide articulation of said housing with respect to said base; and
 means for transmitting the media output signals to said LCD video display and said first speaker assembly and said second speaker assembly residing in said housing.

15. The audio visual system of claim 14 wherein said means for attaching said base to said housing so as to provide articulation of said housing with respect to said base further comprises:
 a housing bracket for supporting said housing; and
 an adjustable arm having,
  at least two rigid arm segments,
  joints between said at least two rigid arm segments, at least one of said joints being a pivotal joint, and
  means for adjusting the torsional load bearing capacity of said joints, said adjustable arm terminating in an arm first end and an arm second end, said arm first end connecting to said base and said arm second end connecting to said housing bracket,
  whereby said means for adjusting the torsional load bearing capacity of said joints allows setting the torsional load bearing of said joints to such a level that the position of the housing can be readily adjusted with respect to said base and the housing remains in place when so positioned.

16. The audio visual system of claim 15 wherein said housing has a top surface and a bottom surface and said housing bracket attaches to said top surface of said housing, and further wherein the audio visual system further comprises:
 LED lamps on said bottom surface of said housing; and
 a switch for selectively activating said LED lamps to allow varying the intensity of light produced by said LED lamps.

17. The improved audio visual system of claim 16 wherein said switch also selectively activates power to the LCD display and the speaker assemblies.

18. The improved audio visual system of claim 16 wherein said switch can selectively activate said LED lamps to provide at least,
 an OFF level of illumination where none of said LED lamps are illumniated;
 a LOW level of illumination where less than all of said LED lamps are illuminated;
 a HIGH level of illumination where all of said LED lamps are illuminated.

19. The audio visual system of claim 15 wherein said arm segments have arm passages therethrough, and said joints have joint passages therethrough which provide communication between said arm passages to accomodate said means for transmitting the media output signals to said LCD video display and to said first and second speaker assemblies, and further wherein, for at least one of said joints, said means for adjusting the torsional load bearing capacity of said joints further comprises:
 a first joint element;
 a second joint element, said first and second joint elements being mounted so as to pivot with respect to each other about a common pivot axis;
 a friction element positioned between said first joint element and said second joint element; and
 means for varying the force of engagement of said first joint element and said second joint element with said friction element, thereby varying the torsional load bearing capacity of said joint.

20. The audio visual system of claim 15 wherein said arm segments have arm passages therethrough, and said joints have joint passages therethrough which provide communication between said arm passages to accomodate said means for transmitting said media output signals to said LCD video display and to said first and second speaker assemblies, and
 further wherein said joints are dual pivoting joints and further wherein, for each of said dual pivoting joints, said means for adjusting the torsional load bearing capacity of said joints further comprises:
  a first saddle bracket frictionally engaging and pivotably attaching to one of said arm segments, said first saddle having a first pivot axis, about which said one of said arm segments pivots, and a first bracket passage;
 means for varying the force of engagement of said first saddle bracket with said one of said arm segments attached thereto;
 a second saddle bracket frictionally engaging and pivotably attaching to another of said arm segments, said second saddle bracket having a second pivot axis, about which said another of said arm segments pivots, and a second bracket passage communicating with said first bracket passage;
 means for varying the force of engagement of said second saddle bracket with said another of said arms attached thereto;

a bracket rotation axis about which said first saddle bracket and said second saddle bracket can rotate with respect to each other;

means for rotatably and frictionally engaging said first saddle bracket with said second saddle bracket so as to allow relative rotation therebetween about said bracket rotation axis; and means for varying the force of the frictional, rotatable engagement of said first saddle bracket with said second saddle bracket.

* * * * *